US009051497B2

(12) United States Patent
Campbell et al.

(10) Patent No.: US 9,051,497 B2
(45) Date of Patent: Jun. 9, 2015

(54) CURABLE COMPOSITIONS

(75) Inventors: Christopher J. Campbell, Burnsville, MN (US); Kevin M. Lewandowski, Inver Grove Heights, MN (US); Kwame Owusu-Adom, Oakdale, MN (US)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 274 days.

(21) Appl. No.: 13/883,400

(22) PCT Filed: Nov. 8, 2011

(86) PCT No.: PCT/US2011/059756
§ 371 (c)(1),
(2), (4) Date: May 3, 2013

(87) PCT Pub. No.: WO2012/064724
PCT Pub. Date: May 18, 2012

(65) Prior Publication Data
US 2013/0225725 A1 Aug. 29, 2013

Related U.S. Application Data

(60) Provisional application No. 61/413,063, filed on Nov. 12, 2010.

(51) Int. Cl.
C08L 63/00 (2006.01)
C09J 163/00 (2006.01)
C08G 59/40 (2006.01)
C08G 59/56 (2006.01)
C09D 163/00 (2006.01)

(52) U.S. Cl.
CPC ............ *C09J 163/00* (2013.01); *C08G 59/4007* (2013.01); *C08G 59/56* (2013.01); *C08L 63/00* (2013.01); *C09D 163/00* (2013.01)

(58) Field of Classification Search
CPC ...................................................... C08L 63/00
USPC ........................................................ 525/396
See application file for complete search history.

(56) References Cited

U.S. PATENT DOCUMENTS

| 4,778,851 | A | 10/1988 | Henton |
| 5,324,773 | A * | 6/1994 | Mafoti et al. ................. 524/714 |
| 5,629,380 | A | 5/1997 | Baldwin |
| 6,015,865 | A | 1/2000 | Blank |
| 6,486,256 | B1 | 11/2002 | Tarbutton |
| 6,632,872 | B1 | 10/2003 | Pellerite |
| 6,645,341 | B1 | 11/2003 | Gordon |
| 6,776,869 | B1 | 8/2004 | Schenkel |
| 6,800,157 | B2 | 10/2004 | Tarbutton |
| 6,884,854 | B2 | 4/2005 | Schoenfeld |
| 6,998,011 | B2 | 2/2006 | Schoenfeld |
| 7,019,075 | B2 | 3/2006 | Righettini |
| 7,259,226 | B1 | 8/2007 | O'Lenick, Jr. |
| 7,511,097 | B2 | 3/2009 | Frick |
| 8,062,468 | B2 | 11/2011 | Finter |
| 2003/0192643 | A1 | 10/2003 | Schoenfeld |
| 2004/0181013 | A1 | 9/2004 | Schenkel |
| 2006/0276601 | A1 | 12/2006 | Lutz |
| 2007/0105983 | A1 | 5/2007 | Kramer |
| 2008/0251202 | A1 | 10/2008 | Eagle |
| 2008/0251203 | A1 | 10/2008 | Lutz |
| 2008/0308212 | A1 | 12/2008 | Sheasley |
| 2009/0065143 | A1 | 3/2009 | Frick |
| 2009/0099312 | A1 | 4/2009 | Weber |
| 2011/0024039 | A1 | 2/2011 | Campbell |
| 2011/0126980 | A1 | 6/2011 | Campbell |
| 2012/0141803 | A1 | 6/2012 | Campbell |
| 2012/0156501 | A1 | 6/2012 | Campbell |

FOREIGN PATENT DOCUMENTS

| CA | 1334700 | 3/1995 |
| EP | 0483974 | 5/1992 |
| EP | 0517167 | 12/1992 |
| EP | 1435383 | 7/2004 |
| EP | 1813630 | 8/2007 |
| WO | WO 2006/128722 | 12/2006 |
| WO | WO 2007/025007 | 3/2007 |
| WO | WO 2008/016889 | 2/2008 |
| WO | WO 2008/089410 | 7/2008 |
| WO | WO 2008/157571 | 12/2008 |
| WO | WO 2009/017690 | 2/2009 |
| WO | WO 2009/059007 | 5/2009 |
| WO | WO 2010/011710 | 1/2010 |
| WO | WO 2010/039614 | 4/2010 |
| WO | WO 2011/031399 | 3/2011 |
| WO | WO 2012/064717 | 5/2012 |

OTHER PUBLICATIONS

Breuer, "Dimer Acids", Kirk-Othmer Encyclopedia of Chemical Technology, John Wiley & Sons, Inc., (2000), pp. 1-13.
Clemens, "Diketene", Chemical Reviews, Apr. 1986, vol. 86, No. 2, pp. 241-318.
Hansen, "Surface Tension by Pendant Drop", Journal of Colloid and Interface Science, Jan. 1991, vol. 141, No. 1, pp. 1-9.
Petrovic, "Polyurethanes from Vegetable Oils", Polymer Reviews, 2008, vol. 48, pp. 109-155.
Pocius, "Adhesion and Adhesives Technology: An Introduction", Second Edition, Carl Hanser Verlag, Munich (2002), Chapter 8, pp. 201-237.
Trevino, "Acetoacetylated castor oil in coatings applications", Progress in Organic Coatings, 2002, vol. 44, pp. 49-54.
Van Krevelen, "Properties of Polymers—Their Correlation with Chemical Structure; Their Numerical Estimation and Prediction From Additive Group Contributions", Third Edition, Elsevier Science Publishers, B.V. (1990), pp. 200-225.
Witzeman, "Transacetoacetylation with tert-Butyl Acetoacetate: Synthetic Applications", Journal of Organic Chemistry, 1991, vol. 56, pp. 1713-1718.
International Search Report for PCT/US2011/059756, 4 pages.

* cited by examiner

*Primary Examiner* — Megan McCulley
(74) *Attorney, Agent, or Firm* — Jean A. Lown

(57) ABSTRACT

Curable compositions, cured compositions, and articles that include the cured compositions are described. The curable composition contains a) an epoxy resin, b) a curing agent, c) a reactive liquid modifier, and d) a toughening agent. The cured compositions can be used as structural adhesives. The reactive liquid modifier is an acetoacetate ester of a dimer alcohol. The cured compositions can be used as adhesives such as structural adhesives or as polymeric coatings.

16 Claims, No Drawings

CURABLE COMPOSITIONS

TECHNICAL FIELD

Curable compositions, cured compositions, and articles that include the cured compositions are described.

BACKGROUND

Various compositions are applied to substrates that may be contaminated with a hydrocarbon-containing material such as various oils and lubricants. Oil contamination is not uncommon on substrates that are part of a vehicle such as an automobile. The presence of this oil contamination can prevent good bonding of coating or adhesive to the substrate.

Removing hydrocarbon-containing materials from the surfaces of substrates can be difficult. Mechanical processes such as dry wiping and/or using pressurized air tend to leave a thin layer of the hydrocarbon-containing material on the surfaces. Liquid cleaning compositions can be effective but these compositions typically need to be collected and recycled or discarded. Additionally, a drying step is typically needed after the cleaning step.

Various adhesive compositions are known that can be used without removing all of the hydrocarbon-containing materials from the surface of the substrate to which the adhesive is applied. Examples include PCT patent application publications WO 2010/011710 A2 (Campbell et al.), WO 2010/039614 A2 (Kolowrot et al.), and WO 2009/059007 A2 (Pressley et al.).

SUMMARY

Curable compositions and cured compositions are described. The curable compositions are typically a two-part epoxy-based formulation. The cured composition can be used in various applications such as those in which the curable composition is applied to either a clean surface or to a surface contaminated with a hydrocarbon-containing material. The cured composition can be used, for example, as a structural adhesive or as a coating. Both the structural adhesive and the coating typically bonds effectively to the substrate even in the presence of a hydrocarbon-containing material.

In a first aspect, a curable composition is provided that includes a first part and a second part. The curable composition contains a) an epoxy resin, b) a curing agent, c) a toughening agent, and d) a reactive liquid modifier. The epoxy resin and the reactive liquid modifier are in the first part of the curable composition and the curing agent is in the second part of the curable composition. The toughening agent can be in the first part, in the second part, or in both the first part and the second part of the curable composition. The curing agent has at least two groups of formula —NR$^1$H where R$^1$ is selected from hydrogen, alkyl, aryl, or alkylaryl. The reactive liquid modifier is an acetoacetate ester of a dimer alcohol, the acetoacetate ester having at least two acetoacetoxy groups.

In a second aspect, a cured composition is provided that includes that reaction product of a curable composition. The curable composition contains a) an epoxy resin, b) a curing agent, c) a toughening agent, and d) a reactive liquid modifier. The curing agent has at least two groups of formula —NR$^1$H where R$^1$ is selected from hydrogen, alkyl, aryl, or alkylaryl. The reactive liquid modifier is an acetoacetate ester of a dimer alcohol, the acetoacetate ester having at least two acetoacetoxy groups.

In a third aspect, an article is provided that includes a first surface and a cured composition positioned adjacent to the first substrate. The cured composition includes the reaction product of a curable composition. The curable composition contains a) an epoxy resin, b) a curing agent, c) a toughening agent, and d) a reactive liquid modifier. The curing agent has at least two groups of formula —NR$^1$H where R$^1$ is selected from hydrogen, alkyl, aryl, or alkylaryl. The reactive liquid modifier is an acetoacetate ester of a dimer alcohol, the acetoacetate ester having at least two acetoacetoxy groups.

The above summary of the present invention is not intended to describe each embodiment or every implementation of the present invention. The Detailed Description and Examples that follow more particularly exemplify these embodiments.

DETAILED DESCRIPTION OF THE INVENTION

Curable compositions and cured adhesives compositions that are reaction products of the curable compositions are described. More specifically, the curable compositions contain a) an epoxy resin, b) a curing agent, c) a toughening agent, and d) a reactive liquid modifier. The curable compositions are typically applied to at least one surface of a substrate and then cured. The at least one surface can be clean or can be contaminated with a hydrocarbon-containing material. In some embodiments, the cured compositions can be used as a coating on a surface. In other embodiments, the cured compositions can be used as structural adhesives to bond together two surfaces. The structural adhesives can be used, for example, to replace or augment conventional joining means such as welds or mechanical fasteners in bonding various surfaces together.

The curable compositions are often in the form of a two-part composition. The epoxy resin is typically separated from the curing agent prior to use of the curable composition. That is, the epoxy resin is typically in a first part and the curing agent is typically in a second part of the curable composition. The first part can include other components that do not react with the epoxy resin or that react with only a portion of the epoxy resin. Likewise, the second part can include other components that do not react with the curing agent or that react with only a portion of the curing agent. The reactive liquid modifier is typically added to the first part to avoid premature reaction with the curing agent. The toughening agent and other optional components such as an oil displacing agent or a filler can be included in the first part, in the second part, or in both the first part and the second part. When the first part and the second part are mixed together, the various components react to form the cured composition.

The epoxy resin that is included in the first part contains at least one epoxy functional group (i.e., oxirane group) per molecule. As used herein, the term oxirane group refers to the following divalent group.

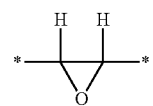

The asterisks denote a site of attachment of the oxirane group to another group. If the oxirane group is at the terminal position of the epoxy resin, the oxirane group is typically bonded to a hydrogen atom.

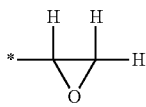

This terminal oxirane group is often part of a glycidyl group.

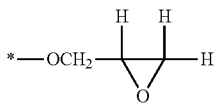

The epoxy resin has at least one oxirane group per molecule and often has at least two oxirane groups per molecule. For example, the epoxy resin can have 1 to 10, 2 to 10, 1 to 6, 2 to 6, 1 to 4, or 2 to 4 oxirane groups per molecule. The oxirane groups are usually part of a glycidyl group.

Epoxy resins can be a single material or a mixture of materials selected to provide the desired viscosity characteristics before curing and to provide the desired mechanical properties after curing. If the epoxy resin is a mixture of materials, at least one of the epoxy resins in the mixture is typically selected to have at least two oxirane groups per molecule. For example, a first epoxy resin in the mixture can have two to four oxirane groups and a second epoxy resin in the mixture can have one to four oxirane groups. In some of these examples, the first epoxy resin is a first glycidyl ether with two to four glycidyl groups and the second epoxy resin is a second glycidyl ether with one to four glycidyl groups.

The portion of the epoxy resin molecule that is not an oxirane group (i.e., the epoxy resin molecule minus the oxirane groups) can be aromatic, aliphatic or a combination thereof and can be linear, branched, cyclic, or a combination thereof. The aromatic and aliphatic portions of the epoxy resin can include heteroatoms or other groups that are not reactive with the oxirane groups. That is, the epoxy resin can include halo groups, oxy groups such as in an ether linkage group, thio groups such as in a thio ether linkage group, carbonyl groups, carbonyloxy groups, carbonylimino groups, phosphono groups, sulfono groups, nitro groups, nitrile groups, and the like. The epoxy resin can also be a silicone-based material such as a polydiorganosiloxane-based material.

Although the epoxy resin can have any suitable molecular weight, the weight average molecular weight is usually at least 100 grams/mole, at least 150 grams/mole, at least 175 grams/mole, at least 200 grams/mole, at least 250 grams/mole, or at least 300 grams/mole. The weight average molecular weight can be up to 50,000 gram/mole or even higher for polymeric epoxy resins. The weight average molecular weight is often up to 40,000 grams/mole, up to 20,000 grams/mole, up to 10,000 grams/mole, up to 5,000 grams/mole, up to 3,000 grams/mole, or up to 1,000 grams/mole. For example, the weight average molecular weight can be in the range of 100 to 50,000 grams/mole, in the range of 100 to 20,000 grams/mole, in the range of 10 to 10,000 grams/mole, in the range of 100 to 5,000 grams/mole, in the range of 200 to 5,000 grams/mole, in the range of 100 to 2,000 grams/mole, in the range of 200 to 2,000 gram/mole, in the range of 100 to 1,000 grams/mole, or in the range of 200 to 1,000 grams/mole.

Suitable epoxy resins are typically a liquid at room temperature (e.g., about 20° C. to about 25° C.). However, epoxy resins that can be dissolved in a suitable solvent also can be used. In most embodiments, the epoxy resin is a glycidyl ether. Exemplary glycidyl ethers can be of Formula (I).

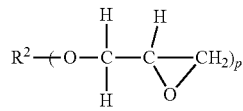

In Formula (I), group $R^2$ is a p-valent group that is aromatic, aliphatic, or a combination thereof. Group $R^2$ can be linear, branched, cyclic, or a combination thereof. Group $R^2$ can optionally include halo groups, oxy groups, thio groups, carbonyl groups, carbonyloxy groups, carbonylimino groups, phosphono groups, sulfono groups, nitro groups, nitrile groups, and the like. Although the variable p can be any suitable integer greater than or equal to 1, p is often an integer in the range of 2 to 10, in the range of 2 to 6, or in the range of 2 to 4.

In some exemplary epoxy resins of Formula (I), the variable p is equal to 2 (i.e., the epoxy resin is a diglycidyl ether) and $R^2$ includes an alkylene (i.e., an alkylene is a divalent radical of an alkane and can be referred to as an alkane-diyl), heteroalkylene (i.e., a heteroalkylene is a divalent radical of a heteroalkane and can be referred to as a heteroalkane-diyl), arylene (i.e., a divalent radical of a arene compound), or combination thereof. Suitable alkylene groups often have 1 to 20 carbon atoms, 1 to 12 carbon atoms, 1 to 8 carbon atoms, or 1 to 4 carbon atoms. Suitable heteroalkylene groups often have 2 to 50 carbon atoms, 2 to 40 carbon atoms, 2 to 30 carbon atoms, 2 to 20 carbon atoms, 2 to 10 carbon atoms, or 2 to 6 carbon atoms with 1 to 10 heteroatoms, 1 to 6 heteroatoms, or 1 to 4 heteroatoms. The heteroatoms in the heteroalkylene can be selected from oxy, thio, or —NH— groups but are often oxy groups. Suitable arylene groups often have 6 to 18 carbon atoms or 6 to 12 carbon atoms. For example, the arylene can be phenylene or biphenylene. Group $R^2$ can further optionally include halo groups, oxy groups, thio groups, carbonyl groups, carbonyloxy groups, carbonylimino groups, phosphono groups, sulfono groups, nitro groups, nitrile groups, and the like. The variable p is usually an integer in the range of 2 to 4.

Some epoxy resins of Formula (I) are diglycidyl ethers where $R^2$ includes (a) an arylene group or (b) an arylene group in combination with an alkylene, heteroalkylene, or both. Group $R^2$ can further include optional groups such as halo groups, oxy groups, thio groups, carbonyl groups, carbonyloxy groups, carbonylimino groups, phosphono groups, sulfono groups, nitro groups, nitrile groups, and the like. These epoxy resins can be prepared, for example, by reacting an aromatic compound having at least two hydroxyl groups with an excess of epichlorohydrin. Examples of useful aromatic compounds having at least two hydroxyl groups include, but are not limited to, resorcinol, catechol, hydroquinone, p,p'-dihydroxydibenzyl, p,p'-dihydroxyphenylsulfone, p,p'-dihydroxybenzophenone, 2,2'-dihydroxyphenyl sulfone, and p,p'-dihydroxybenzophenone. Still other examples include the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Some commercially available diglycidyl ether epoxy resins of Formula (I) are derived from bisphenol A (i.e., bisphenol A is 4,4'-dihydroxydiphenylmethane). Examples include, but are not limited to, those available under the trade designation EPON (e.g., EPON 828, EPON 872, and EPON 1001) from Hexion Specialty Chemicals, Inc. in Houston, Tex., those available under the trade designation DER (e.g., DER 331, DER 332, and DER 336) from Dow Chemical Co. in Midland, Mich., and those available under the trade designation EPICLON (e.g., EPICLON 850) from Dainippon Ink and Chemicals, Inc. in Chiba, Japan. Other commercially available diglycidyl ether epoxy resins are derived from bisphenol F (i.e., bisphenol F is 2,2'-dihydroxydiphenylmethane). Examples include, but are not limited to, those available under the trade designation DER (e.g., DER 334) from Dow Chemical Co. and those available under the trade designation EPICLON (e.g., EPICLON 830) from Dainippon Ink and Chemicals, Inc.

Other epoxy resins of Formula (I) are diglycidyl ethers of a poly(alkylene oxide)diol. These epoxy resins also can be referred to as diglycidyl ethers of a poly(alkylene glycol)diol. The variable p is equal to 2 and $R^2$ is a heteroalkylene having oxygen heteroatoms. The poly(alkylene glycol) portion can be a copolymer or homopolymer and often include alkylene units having 1 to 4 carbon atoms. Examples include, but are not limited to, diglycidyl ethers of poly(ethylene oxide)diol, diglycidyl ethers of poly(propylene oxide)diol, and diglycidyl ethers of poly(tetramethylene oxide)diol. Epoxy resins of this type are commercially available from Polysciences, Inc. in Warrington, Pa. such as those derived from a poly(ethylene oxide)diol or from a poly(propylene oxide)diol having a weight average molecular weight of about 400 grams/mole, about 600 grams/mole, or about 1000 gram/mole.

Still other epoxy resins of Formula (I) are diglycidyl ethers of an alkane diol ($R^2$ is an alkylene and the variable p is equal to 2). Examples include a diglycidyl ether of 1,4-dimethanol cylcohexyl, diglycidyl ether of 1,4-butanediol, and diglycidyl ethers of the cycloaliphatic diol formed from a hydrogenated bisphenol A such as those commercially available under the trade designation EPONEX 1510 from Hexion Specialty Chemicals, Inc. of Columbus, Ohio.

Yet other epoxy resins include silicone resins with at least two glycidyl groups and flame retardant epoxy resins with at least two glycidyl groups (e.g., a brominated bisphenol-type epoxy resin having with at least two glycidyl groups such as that commercially available from Dow Chemical Co. in Midland, Mich. under the trade designation DER 580).

The epoxy resin is often a mixture of materials. For example, the epoxy resins can be selected to be a mixture that provides the desired viscosity or flow characteristics prior to curing. The mixture can include at least one first epoxy resin that is referred to as a reactive diluent that has a lower viscosity and at least one second epoxy resin that has a higher viscosity. The reactive diluent tends to lower the viscosity of the epoxy resin mixture and often has either a branched backbone that is saturated or a cyclic backbone that is saturated or unsaturated. Examples include, but are not limited to, the diglycidyl ether of resorcinol, the diglycidyl ether of cyclohexane dimethanol, the diglycidyl ether of neopentyl glycol, and the triglycidyl ether of trimethylolpropane. Diglycidyl ethers of cyclohexane dimethanol are commercially available under the trade designation HELOXY MODIFIER 107 from Hexion Specialty Chemicals in Columbus, Ohio and under the trade designation EPODIL 757 from Air Products and Chemical Inc. in Allentonwn, Pa. Other reactive diluents have only one functional group (i.e., oxirane group) such as various monoglycidyl ethers. Some exemplary monoglycidyl ethers include, but are not limited to, alkyl glycidyl ethers with an alkyl group having 1 to 20 carbon atoms, 1 to 12 carbon atoms, 1 to 8 carbon atoms, or 1 to 4 carbon atoms. Some exemplary monoglycidyl ethers are commercially available under the trade designation EPODIL from Air Products and Chemical, Inc. in Allentown, Pa. such as EPODIL 746 (2-ethylhexyl glycidyl ether), EPODIL 747 (aliphatic glycidyl ether), and EPODIL 748 (aliphatic glycidyl ether).

In most embodiments, the epoxy resin includes one or more glycidyl ethers and does not include epoxy alkanes and epoxy esters. Epoxy alkanes and epoxy esters can be included in the curable compositions, however, as oil displacing agents.

The curable composition typically includes at least 20 weight percent epoxy resin based on a combined weight of the first part and the second part (i.e., based on a total weight of the curable composition). For example, the curable composition can include at least 25 weight percent, at least 30 weight percent, at least 40 weight percent, or at least 50 weight percent epoxy resin. The curable composition often includes up to 90 weight percent epoxy resin. For example, the curable composition can include up 80 weight percent, up to 75 weight percent, up to 70 weight percent, up to 65 weight percent, or up to 60 weight percent epoxy resin. Some exemplary curable compositions contain 20 to 90 weight percent, 20 to 80 weight percent, 20 to 70 weight percent, 30 to 90 weight percent, 30 to 80 weight percent, 30 to 70 weight percent, 30 to 60 weight percent, 40 to 90 weight percent, 40 to 80 weight percent, 40 to 70 weight percent, 50 to 90 weight percent, 50 to 80 weight percent, or 50 to 70 weight percent epoxy resin.

The epoxy resin is cured by reacting with a curing agent that is typically in a second part of the curable composition. The epoxy resin is typically separated from the curing agent during storage or prior to using the curable composition. The curing agent has at least two primary amino groups, at least two secondary amino groups, or combinations thereof. That is, the curing agent has at least two groups of formula —$NR^1H$ where $R^1$ is selected from hydrogen, alkyl, aryl, or alkylaryl. Suitable alkyl groups often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups usually have 6 to 12 carbon atom such as a phenyl or biphenyl group. Suitable alkylaryl groups can be either an alkyl substituted with an aryl or an aryl substituted with an alkyl. The same aryl and alkyl groups discussed above can be used in the alkylaryl groups.

When the first part and the second part of the curable composition are mixed together, the primary and/or secondary amino groups of the curing agent react with the oxirane groups of the epoxy resin. This reaction opens the oxirane groups and covalently bonds the curing agent to the epoxy resin. The reaction results in the formation of divalent groups of formula —$OCH_2$—$CH_2$—$NR^1$— where $R^1$ is equal to hydrogen, alkyl, aryl, or alkylaryl.

The curing agent minus the at least two amino groups (i.e., the portion of the curing agent that is not an amino group) can be any suitable aromatic group, aliphatic group, or combination thereof. Some amine curing agents are of Formula (III) with the additional limitation that there are at least two primary amino groups, at least two secondary amino groups, or at least one primary amino group and at least one secondary amino group.

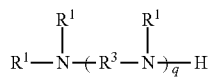
(III)

Each $R^1$ group is independently hydrogen, alkyl, aryl, or alkylaryl. Suitable alkyl groups for $R^1$ often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups for $R^1$ often have 6 to 12 carbon atoms such as a phenyl or biphenyl group. Suitable alkylaryl groups for $R^1$ can be either an alkyl substituted with an aryl or an aryl substituted with an alkyl. The same aryl and alkyl groups discussed above can be used in the alkylaryl groups. Each $R^3$ is independently an alkylene, heteroalkylene, or combination thereof. Suitable alkylene groups often have 1 to 18 carbon atoms, 1 to 12 carbon atoms, 1 to 8 carbon atoms, 1 to 6 carbon atoms, or 1 to 4 carbon atoms. Suitable heteroalkylene groups have at least one oxy, thio, or —NH— group positioned between two alkylene groups. Suitable heteroalkylene groups often have 2 to 50 carbon atoms, 2 to 40 carbon atoms, 2 to 30 carbon atoms, 2 to 20 carbon atoms, or 2 to 10 carbon atoms and with up to 20 heteroatoms, up to 16 heteroatoms, up to 12 heteroatoms, or up to 10 heteroatoms. The heteroatoms are often oxy groups. The variable q is an integer equal to at least one and can be up to 10 or higher, up to 5, up to 4, or up to 3.

Some amine curing agents can have an $R^3$ group selected from an alkylene group. Examples include, but are not limited to, ethylene diamine, diethylene diamine, diethylene triamine, triethylene tetramine, propylene diamine, tetraethylene pentamine, hexaethylene heptamine, hexamethylene diamine, 2-methyl-1,5-pentamethylene diamine, 1-amino-3-aminomethyl-3,3,5-trimethylcyclohexane (also called isophorene diamine), and the like. Other amine curing agents can have an $R^3$ group selected from a heteroalkylene group such as a heteroalkylene having oxygen heteroatoms. For example, the curing agent can be a compound such as aminoethylpiperazine, 4,7,10-trioxamidecane-1,13-diamine (TTD) available from TCI America in Portland, Oreg., or a poly(alkylene oxide)diamine (also called polyether diamines) such as a poly(ethylene oxide)diamine, poly(propylene oxide)diamine, or a copolymer thereof. Commercially available polyether diamines are commercially available under the trade designation JEFFAMINE form Huntsman Corporation in The Woodlands, Tex.

Still other amine curing agents can be formed by reacting a polyamine (i.e., a polyamine refers to an amine with at least two amino groups selected from primary amino groups and secondary amino groups) with another reactant to form an amine-containing adduct having at least two amino groups. For example, a polyamine can be reacted with an epoxy resin to form an adduct having at least two amino groups. If a polymeric diamine is reacted with a dicarboxylic acid in a molar ratio of diamine to dicarboxylic acid that is greater than or equal to 2:1, a polyamidoamine having two amino groups can be formed. In another example, if a polymeric diamine is reacted with an epoxy resin having two glycidyl groups in a molar ratio of diamine to epoxy resin greater than or equal to 2:1, an amine-containing adduct having two amino groups can be formed. Such a polyamidoamine can be prepared as describe, for example, in U.S. Pat. No. 5,629,380 (Baldwin et al.). A molar excess of the polymeric diamine is often used so that the curing agent includes both the amine-containing adduct plus free (non-reacted) polymeric diamine. For example, the molar ratio of diamine to epoxy resin with two glycidyl groups can be greater than 2.5:1, greater than 3:1, greater than 3.5:1, or greater than 4:1. Even when epoxy resin is used to form the amine-containing adduct in the second part of the curable composition, additional epoxy resin is present in the first part of the curable composition.

The curing agent can be a mixture of materials. For example, the curing agent can include a first curing agent that is a polymeric material added to enhance flexibility of the cured composition plus a second curing agent that is added to alter the glass transition temperature of the cured composition.

The curable compositions usually contain at least 3 weight percent curing agent based on a total weight of the curable composition. For example, the total curable composition can contain at least 3 weight percent, at least 5 weight percent, or at least 10 weight percent of the curing agent. The adhesive composition typically includes up to 30 weight percent, up to 25 weight percent, up to 20 weight percent, or up to 15 weight percent of the curing agent. For example, the curable composition can contain 3 to 30 weight percent, 3 to 25 weight percent, 3 to 20 weight percent, 3 to 15 weight percent, 3 to 10 weight percent, 5 to 30 weight percent, 5 to 25 weight percent, 5 to 20 weight percent, or 5 to 15 weight percent of the curing agent.

Other curing agents can be included in the curable composition. These other curing agents are typically considered to be secondary curatives because, compared to curing agents having at least two groups of formula —$NHR^1$, they are not as reactive with the oxarine rings of the epoxy resins at room temperature. Secondary curatives are often imidizoles or salts thereof, imidazolines or salts thereof, or phenols substituted with tertiary amino groups. Suitable phenols substituted with tertiary amino groups can be of Formula (IV).

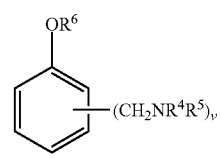
(IV)

In Formula (IV), each group $R^4$ and $R^5$ is independently an alkyl. The variable v is an integer equal to 2 or 3. Group $R^6$ is hydrogen or alkyl. Suitable alkyl groups for $R^4$, $R^5$, and $R^6$ often have 1 to 12 carbon atoms, 1 to 8 carbon atoms, 1 to 6 carbon atoms, or 1 to 4 carbon atoms. One exemplary secondary curative of Formula (IV) is tris-2,4,6-(dimethylaminomethyl)phenol that is commercially available under the trade designation ANCAMINE K54 from Air Products Chemicals, Inc. of Allentown, Pa.

The optional secondary curative can be present in the first part of the curable composition with the epoxy resin and the reactive liquid modifier, in the second part of the curable composition with the curing agent, or in both the first and second parts. The amount of the secondary curative is typically up to 6 weight percent, up to 5 weight percent, or up to 4 weight percent base on a total weight of the curable composition. If included in the first part (epoxy part), the secondary curative can be present in an amount in the range of 0 to 15 weight percent, in the range of 0.5 to 10 weight percent, or in the range of 1 to 5 weight percent based on a total weight of the first part. If included in the second part (curing agent part), the secondary curative can be present in an amount in the range of 0 to 5 weight percent, in the range of 0.5 to 5 weight percent, or in the range of 1 to 5 percent based on a total weight of the second part.

The curable composition further includes a reactive liquid modifier that is added to enhance the flexibility of the cured composition, to enhance the impact resistance of the cured composition, to enhance the effect of the toughening agent, or a combination thereof. In some embodiments, the reactive liquid modifier allows adherence to a surface contaminated with a hydrocarbon-containing material even in the absence of an oil-displacing compound or a filler material capable of adsorbing the hydrocarbon-containing material.

The reactive liquid modifier is an acetoacetate ester of a dimer alcohol. The acetoacetate ester has at least two acetoacetoxy groups (—O(CO)—CH$_2$—(CO)—CH$_3$) and often has two acetoacetoxy groups. Any known method of preparing the acetoacetate ester can be used. For example, the acetoacetate ester can be prepared by acetoacetylation of dimer alcohols having at least two hydroxyl groups (e.g., the dimer alcohols often have two hydroxyl groups) with an alkyl aceotacetate, a diketene, or other acetoacetylating compound. Suitable methods of preparing the acetoacetate esters are described, for example, in the article R. J. Clemens, *Chem. Rev.*, 86(2), 241-318 (1986) and in the article J. W. Witzeman and W. D. Nottingham, *J. Org. Chem.*, 56(5), 1713-1718 (1991).

In many embodiments, the reactive liquid modifier is a reaction product of (i) an alkyl acetoacetate and (ii) a dimer alcohol. An example reaction is shown in Reaction Scheme A with the dimer alcohol of Formula (VI) and an alkyl acetoacetate of Formula (V).

Reaction Scheme A

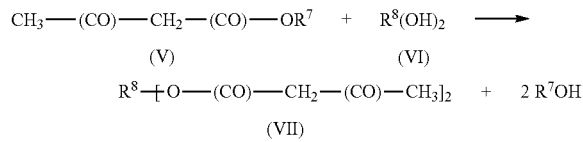

Suitable alkyl acetoacetate compounds for use in this reaction scheme are of Formula (V).

Group $R^7$ is an alkyl having 1 to 10 carbon atoms, 1 to 6 carbon atoms or 1 to 4 carbon atoms. The alkyl group can be linear, branched, cyclic, or a combination thereof. In some embodiments, $R^7$ is a tert-butyl group.

A dimer alcohol is reacted with the alkyl acetoacetate to form the reactive liquid modifier. As used herein, the term "dimer alcohol" refers to the alcohol that is formed by hydrogenation of various dimer acids. Dimer acids often have 36 carbon atoms and are typically formed by the dimerization of unsaturated fatty acids having 18 carbon atoms such as oleic acid or tall oil fatty acid. The dimer acids are often unsaturated but the dimer alcohols formed from the dimer acids are typically saturated. The dimer alcohols can be cyclic or non-cyclic compounds and typically have 36 carbon atoms. The dimer alcohols usually have two hydroxyl groups (i.e., the dimer alcohols are dimer diols).

As shown in Reaction Scheme A, the dimer alcohol can often be represented by Formula (VI).

In Formula (VI), the group $R^8$ is an alkylene having 36 carbon atoms. The alkylene group can be cyclic or non-cyclic. Cyclic alkylene groups can contain one ring or two rings that are fused together. The hydroxyl groups are typically not attached directly to a ring.

Although the dimer alcohols can have many different constituents, some common constituents are shown below.

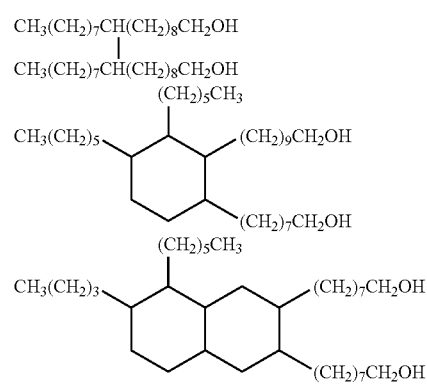

The reactive liquid modifier that is often of Formula (VII).

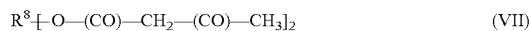

The group $R^8$ is the same as defined previously for Formula (VI).

Although any known method of forming the reaction liquid modifier can be used, the acetoacetate ester is often formed from the reaction of (i) an alkyl acetoacetate and (ii) dimer alcohol. This reaction is often conducted in the presence of an organic solvent such as xylene, toluene, or a mixture thereof. The reactants can be, for example, heated at a temperature such as about 110° C., about 115° C., or about 120° C. At such a reaction temperature, the alcohol by-product ($R^7$OH in Reaction Scheme A) can be removed by distillation. Equimolar amounts or nearly equimolar amount of the alkyl acetoacetate and the hydroxyl groups in the dimer alcohol are used. An excess of the alkyl acetoacetate can be used to get full conversion of the dimer alcohol. However, if some residual hydroxyl functionality is desired, an excess of dimer alcohol can be used. Suitable reaction conditions are further described, for example, in the article by Witzeman et al., *J. Org., Chem.*, 56, 1713-1718 (1991).

The reactive liquid modifier with at least two acetoacetoxy groups is typically not reactive with the epoxy resin but is reactive with the curing agent. The reactive liquid modifier is usually added to the first part of the curable composition to minimize premature reaction with the curing agent in the second part. The reactive liquid modifier is typically not reactive at room temperature with the secondary curatives and can be mixed with such materials in the first part of the curable composition.

The reactive liquid modifier can react with the curing agent having primary amino groups. The primary amino groups can react with the terminal carbonyl group of the reactive liquid modifier. For purposes of simplicity, the reaction of a single primary amino group of an example curing agent (H$_2$N—$R^{12}$—NH$_2$) with each acetoacetate groups on the reactive liquid modifier of Formula (VII) is shown in Reaction Scheme B. The group $R^{12}$ is the remainder of the curing agent minus two primary amino groups. The unreacted primary amino groups in the compounds of Formula (IX) can react with other terminal carbonyl groups on another liquid modifier.

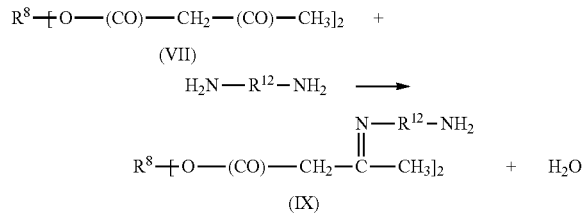

Reaction Scheme B

This reaction between the curing agent and the reactive liquid modifier typically occurs at a faster rate than the reaction between the curing agent and the epoxy resin. Any curing agent not consumed by the reaction with the reactive liquid modifier can then be reacted with the epoxy resin.

The curable composition often contains at least 3 weight percent of the reactive liquid modifier based on a total weight of the curable composition. The reactive liquid modifier is often present in an amount equal to at least 4 weight percent, at least 5 weight percent, at least 7 weight percent, or at least 10 weight percent based on the total weight of the curable composition. The curable composition often contains up to 20 weight percent of the reactive liquid modifier. This amount can be up to 18 weight percent, up to 15 weight percent, up to 12 weight percent, or up to 10 weight percent. For example, the reactive liquid modifier is often in the range of 3 to 20 weight percent, 4 to 20 weight percent, 4 to 15 weight percent, 4 to 12 weight percent, 4 to 10 weight percent, or 5 to 10 weight percent based on the total weight of the curable composition.

If the curing reaction occurs at room temperature, the curing agent in the curable composition, the ratio of amine hydrogen equivalent weight to epoxy equivalent weight is often at least 0.5:1, at least 0.8:1, or at least 1:1. The ratio can up be to 2:1, up to 1.5:1, up to 1.2:1, or up to 1.1:1. For example, the ratio can be in the range of 0.5:1 to 2:1, in the range of 0.5:1 to 1.5:1, in the range of 0.8:1 to 2:1, in the range of 0.8:1 to 1.5:1, in the range of 0.8:1 to 1.2:1, in the range of 0.9:1 to 1.1:1, or about 1:1. The ratio is often selected so that there is sufficient amine curing agent present to react with both the epoxy resin and the reactive liquid modifier.

If the curing temperature occurs at elevated temperatures (e.g., temperatures above 100° C. or above 120° C. or above 150° C.), however, a lower amount of the amine curing agent is often used. The amount of the curing agent in the curable composition is often present in a sufficient molar amount to react with the reactive liquid modifier and with a portion of the epoxy resin. For example, the ratio of amine hydrogen equivalent weight to epoxy equivalent weight is often less than 1:1 such in the range of 0.2:1 to 0.8:1, in the range of 0.2:1 to 0.6:1, or in the range of 0.3:1 to 0.5:1. Any epoxy resin that is not reacted with the curing agent tends to undergo homopolymerization at elevated temperatures.

The cured composition is less likely to crack or break upon impact when the reactive liquid modifier is included in the curable composition. That is, the reactive liquid modifier typically improves the impact peel strength of the cured composition. The impact peel strength is usually greater than 10 Newtons per millimeter (N/MM), greater than 13 N/mm, greater than 15 N/mm, greater than 20 N/mm, greater than 25 N/mm, or greater than 30 N/mm.

The curable compositions also include a toughening agent. The toughening agents are polymers other than the curable epoxy resins or the reactive liquid modifiers that are capable of enhancing the toughness of the cured composition. The toughness can be characterized by measuring the T-peel strength of the cured compositions. T-peel strength is often greater than 18 lb/in-width (i.e., 18 foot-pounds per inch width), which is equal to 79 Newtons per 25 mm (i.e., 79 N/25 mm) The T-peel strength can be greater than 20 lb/in-width (87 N/25 mm), greater than 25 lb/in-width (109 N/25 mm), greater than 30 lb/in-width (131 N/25 mm), greater than 40 lb/in-width (175 N/25 mm), greater than 50 lb/in-width (219 N/25 mm), or greater than 60 lb/in-width (263 N/25 mm) The toughening agents can be added to the first part of the curable composition with the epoxy resin and reactive liquid modifier, to the second part of the curable composition with the curing agent, or to both the first and second part of the curable composition. Typical toughening agents include core-shell polymers, butadiene-nitrile rubbers, acrylic polymers and copolymers, and the like.

Some toughening agents are core-shell polymers. A shell polymeric material is typically grafted to a core polymeric material. The core is usually an elastomeric material with a glass transition temperature less than 0° C. The shell is usually a polymeric material having a glass transition temperature greater than 25° C. The glass transition temperature can be determined using dynamic mechanical thermal analysis (DMTA) or a similar method.

The core of the core-shell polymeric toughening agents is often prepared from a butadiene polymer or copolymer, a styrene polymer or copolymer, an acrylonitrile polymer or copolymer, an acrylate polymer or copolymer, or combinations thereof. These polymers or copolymers can be crosslinked or not crosslinked. Some exemplary shells are polymethylmethacrylates that are either crosslinked or not crosslinked. Other exemplary shells are butadiene-styrene copolymers that are either crosslinked or not crosslinked.

The shell of the core-shell polymeric toughening agents are often formed from a styrene polymer or copolymer, a methacrylate polymer or copolymer, an acrylonitrile polymer or copolymer, or combinations thereof. The shell can be further functionalized with epoxy groups, acidic groups, or acetoacetoxy groups. Functionalization of the shell may be achieved, for example, by copolymerization with glycidylmethacrylate or acrylic acid or by reaction of a hydroxyl group with an alkyl acetoacetoxy such as tert-butyl acetoacetoxy. The addition of these functional groups can result in the shell being crosslinked into the polymeric matrix.

Suitable core-shell polymers often have an average particle size equal to at least 10 nanometers, at least 20 nanometers, at least 50 nanometers, at least 100 nanometers, at least 150 nanometers, or at least 200 nanometers. The average particle size can be up to 400 nanometers, up to 500 nanometers, up to 750 nanometers, or up to 1000 nanometers. The average particle size can be, for example, in the range of 10 to 1000 nanometers, in the range of 50 to 1000 nanometers, in the range of 100 to 750 nanometers, or in the range of 150 to 500 nanometers.

Exemplary core-shell polymers and their preparation are described in U.S. Pat. No. 4,778,851 (Henton et al.). Commercially available core-shell polymers can be obtained, for example, under the trade designation PARALOID (e.g., PARALOID EXL 2600 and PARALOID EXL 2691) from Rohm & Haas Company in Philadelphia, Pa. and under the trade designation KANE ACE (e.g., KANE ACE B564, KANE ACE MX120, KANE ACE MX257, and KANE ACE MX153) from Kaneka in Belgium.

Still other toughening agents can be prepared by reacting amino-terminated materials or carboxy-terminated materials with an epoxy resin to prepare an adduct that phase separates from the other components in the cured composition. Suitable amino-terminated materials that can be used to prepare such toughening agents include, but are not limited to, those commercially available under the trade designation DYNAMAR POLYETHERDIAMINE HC 1101 from 3M Corporation in Saint Paul, Minn. This is a linear polymeric material. Suitable carboxy-terminated materials include carboxy-terminated butadiene acrylonitrile copolymers such as those commercially available from Emerald Chemical in Alfred, Me.

The curable compositions often include at least 5 weight percent of the toughening agent based on a total weight of the curable composition. For example, the curable compositions can include at least 10 weight percent, at least 15 weight percent, at least 20 weight percent, or at least 25 weight percent of the toughening agent. The amount of the toughening agent often can be up to 55 weight percent based on a total weight of the curable composition. For example, the curable composition can include up to 50 weight percent, up to 45 weight percent, up to 40 weight percent, up to 35 weight percent, up to 30 weight percent, or up to 25 weight percent of the toughening agent. In some embodiments, the curable composition contains 5 to 55 weight percent, 5 to 50 weight percent, 5 to 40 weight percent, 5 to 30 weight percent, 5 to 20 weight percent, or 5 to 15 weight percent of the toughening agent.

Some curable compositions contain at least 20 weight percent epoxy resin, at least 3 weight percent curing agent, at least 3 weight percent reactive liquid modifier, and at least 5 weight percent toughening agent based on a total weight of the curable composition. Some exemplary curable compositions contain 20 to 90 weight percent epoxy resin, 3 to 30 weight percent curing agent, 3 to 20 weight percent reactive liquid modifier, and 5 to 55 weight percent toughening agent based on a total weight of the curable composition. Other exemplary curable compositions contain 20 to 70 weight percent epoxy resin, 3 to 20 weight percent curing agent, 4 to 15 weight percent reactive liquid modifier, and 5 to 40 weight percent toughening agent. Still other exemplary curable compositions contain 30 to 60 weight percent epoxy resin, 5 to 20 weight percent curing agent, 4 to 10 weight percent reactive liquid modifier, and 5 to 30 weight percent toughening agent. The amounts are based on the total weight of the curable composition.

Still other optional components can be included in the curable compositions. For example, various accelerators such as various metal salts can be added. Useful metal salts include, for example, calcium ($Ca^{+2}$) salts, magnesium ($Mg^{+2}$) salts, bismuth ($Bi^{+3}$) salts, cerium ($Ce^{+3}$) salts, iron salts ($Fe^{+3}$), lead ($Pb^{+1}$) salts, copper ($Cu^{+2}$) salts, cobalt ($Co^{+2}$) salts, lanthanum ($La^{+3}$) salts, lithium ($Li^{+1}$) salts, indium ($In^{+3}$) salts, thallium ($Th^{+4}$) salts, beryllium ($Be^{+2}$) salts, barium ($Ba^{+2}$) salts, strontium ($Sr^{+2}$) salts, and zinc ($Zn^{+2}$) salts. In many embodiments, the accelerators are selected to be calcium salts, magnesium salts or lanthanum salts. Suitable anions of the metal salts include, but are not limited to, $NO_3^-$, $CF_3SO_3^-$, $ClO_4^-$, $BF_4^-$, $CH_3C_6H_4SO_3^-$, and $SbF_6^-$.

In some known curable compositions that are positioned adjacent to a substrate that may be contaminated with a hydrocarbon-containing material, an oil displacing agent that is soluble in the curable composition is added. As used herein, the term "hydrocarbon-containing material" refers to a variety of substances that can contaminate the surface of the substrate during processing, handling, storage, or combinations thereof. Examples of hydrocarbon-containing materials include, but are not limited to, mineral oils, fats, dry lubricants, deep drawing oils, corrosion protection agents, lubricating agents, waxes, and the like. The surface of the substrate may contain other contaminants in addition to the hydrocarbon-containing material. While not wishing to be bound by theory, the oil displacing agent may facilitate transfer of the hydrocarbon-containing away from the surface of the substrate and into the bulk of the curable composition. This transfer away from the surface of the substrate may result in improved adhesive bond strength. Sufficient adhesive bond strength can often be obtained without the need for a heat curing step.

Surprisingly, when the reactive liquid modifiers described herein are included in the curable composition, an oil displacing agent is often not needed. Good bond strength between the cured composition and the substrate can be obtained even in the absence of the oil displacing agent regardless of whether the substrate is clean or contaminated with a hydrocarbon-containing material. That is, an oil displacing agent is often not included in the curable composition. Stated differently, the curable composition can be free or substantially free (e.g., less than 0.01 weight percent, less than 0.02 weight percent, less than 0.05 weight percent, or less than 0.1 weight percent based on the weight of the curable composition).

In some applications, it might be desirable to exclude oil displacing agents. If a non-reactive oil displacing agent is used, this material could possibly depress the glass transition temperature of the cured system by functioning as a plasticizer. If a reactive oil displacing agent is used, this material is often monofunctional. The addition of a monofunctional material can reduce the crosslink density of the cured system and this is possibly lower the glass transition temperature. Lower glass transition temperatures can lead to poorer performance at higher temperatures and/or elevated humidity conditions.

In other applications, however, it might be desirable to include oil displacing agents. The various formulations can typically tolerate the addition of at least some oil displacing agent. If an oil displacing agent is added to the curable composition, it can be added to the first part of the curable composition containing the epoxy resin and the reactive liquid modifier, to the second part of the curable composition containing the curing agent, or to both the first part and the second part. The oil displacing agent can be added to promote adhesion between the cured composition and the surface of a substrate that is contaminated with an amount of hydrocarbon-containing material in excess of the amount that can be treated effectively with the reactive liquid modifier.

The oil displacing agents are usually liquids at room temperature. These agents are typically capable of disrupting or displacing hydrocarbon-containing material at the surface of the substrate while remaining miscible both with the curable composition during application and with the resulting cured composition. Suitable oil displacing agents often have a surface tension that is lower than that of the hydrocarbon-containing material and a solubility parameter similar to that of the hydrocarbon-containing material.

The oil displacing agents usually have a surface tension up to 35 dynes per centimeter (dynes/cm). For example, the surface tension can be up to 35 dynes/cm, up to 32 dynes/cm, up to 30 dynes/cm, or up to 25 dynes/cm. The surface tension is often at least 15 dynes/cm, at least 18 dynes/cm, or at least 20 dynes/cm. For example, the surface tension can be in the range of 15 to 35 dynes/cm, in the range of 15 to 32 dynes/cm, in the range of 15 to 30 dynes/cm, in the range of 20 to 35 dynes/cm, in the range of 20 to 30 dynes/cm, in the range of 25 to 35 dynes/cm, or in the range of 25 to 30 dynes/cm. The surface tension can be measured, for example, using the so-called pendant drop test (also referred to as the pendant drop shape analysis method) as specified in the article by F. K. Hansen et al. in *J. Coll. and Inter. Sci.*, 141, 1-12 (1991).

If the hydrocarbon-containing material on the surface of the substrate is known, the oil displacing agent can be selected to have a surface tension that is less than the surface tension of the hydrocarbon-containing material. More specifically, the oil displacing agent can be selected to have a surface tension that is at least 2.5 dynes/cm less than that of the hydrocarbon-containing material. For example, the surface tension of the oil displacing agent can be at least 4.0 dynes/cm less than, at least 8.0 dynes/cm less than, or at least 12.0 dynes/cm less than that of the hydrocarbon-containing material.

In many embodiments, the solubility parameter of the oil displacing agent is in the range of 6 to 12 cal$^{0.5}$/cm$^{1.5}$. For example, the solubility parameter can be in the range of 7 to 12 cal$^{0.5}$/cm$^{1.5}$, in the range of 8 to 12 cal$^{0.5}$/cm$^{1.5}$, in the range of 7 to 10.5 cal$^{0.5}$/cm$^{1.5}$, in the range of 7 to 9 cal$^{0.5}$/cm$^{1.5}$, or in the range of 7.5 to 9 cal$^{0.5}$/cm$^{1.5}$. The solubility parameter can be calculated, for example, with software commercially available under the trade designation MOLECULAR MODELING PRO from ChemSW, Inc. of Fairfield, Calif. using the method described by D. W. van Krevelen in the book Properties of Polymers: Their Correlation with Chemical Structure: Their Numerical Estimation and Prediction from Additive Group Contributions, 4$^{th}$ edition, pp. 200-225, 1990, published by Elsevier in Amsterdam, The Netherlands.

Empirical methods can be used to identify suitable oil displacing agents for a particular application. For example, approximately 20 to 100 microliters of a candidate oil displacing agent can be gently deposited on the surface of an substrate covered with a film of the hydrocarbon-containing material. Suitable candidate oil displacing agents will typically spread out and cause the film of hydrocarbon-containing material to rupture. While not wishing to be bound by theory, suitable oil displacing agents are believed to at least partially dissolve the hydrocarbon-containing material and/or to at least partially diffuse into the hydrocarbon-containing material. The droplet of suitable oil displacing agents tends to push the hydrocarbon-containing material outward from the impact area.

Although empirical methods can facilitate the relatively quick identification of potential oil displacing agents, not all compounds that pass such a test can be used successfully as oil displacing agents based on other considerations. For example, some compounds can cause film rupture but are too volatile in the curable compositions or not suitably miscible with the curable composition to be effective as oil displacing agents.

Many different classes of compounds may be suitable for the oil displacing agent. Suitable types of compounds often include, but are not limited to, glycidyl esters, cyclic terpenes, cyclic terpene oxides, mono-esters, di-esters, tri-esters, trialkyl phosphates, epoxy alkanes, alkyl methacrylates, vinyl alkyl esters, alkanes, and alcohols. The oil displacing agent is typically not a glycidyl ether.

Some oil displacing agents are glycidyl esters of Formula (X).

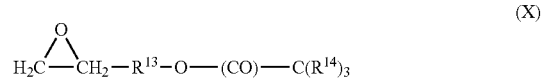

In Formula (X), group $R^{13}$ is an alkylene having 1 to 18 carbon atoms, 1 to 12 carbon atoms, 1 to 10 carbon atoms, 1 to 8 carbon atoms, 1 to 6 carbon atoms, or 1 to 4 carbon atoms. In some exemplary compounds of Formula (X), group $R^{13}$ is methylene. Each group $R^{14}$ is independently a linear or branched alkyl having 1 to 12 carbon atoms, 1 to 10 carbon atoms, 1 to 8 carbon atoms, 1 to 6 carbon atoms, or 1 to 4 carbon atoms. One exemplary compound of Formula (X) is commercially available under the trade designation CARDURA N10 from Hexion Specialty Chemicals in Columbus, Ohio. This oil displacing agent is a glycidyl ester of a highly branched tertiary carboxylic acid (neodecanoic acid) having 10 carbon atoms.

Some oil displacing agents are esters. Suitable mono-esters can be of Formula (X).

In Formula (XI), the group $R^{16}$ is usually a linear or branched alkyl having 1 to 20 carbon atoms, 1 to 18 carbon atoms, 1 to 12 carbon atoms, or 1 to 8 carbon atoms. Group $R^{15}$ is an alkyl, an alkene-yl (i.e., an alkene-yl is a monovalent radical of an alkene), an aryl, or an arylalkyl. Suitable alkyl and alkene-yl groups for $R^{15}$ often have 6 to 20 carbon atoms, 8 to 20 carbon atoms, 8 to 18 carbon atoms, or 8 to 12 carbon atoms. The alkyl and alkene-yl can be unsubstituted or substituted with a hydroxyl group, an amino group, an aryl group, or an alkylaryl group. Suitable amino group substituents are of formula —N($R^1$)$_2$ where each $R^1$ is independently an hydrogen, alkyl, aryl, or alkylaryl. Suitable aryl groups for $R^1$, $R^{15}$, and substituents often have 6 to 12 carbon atoms. The aryl group is often phenyl or biphenyl. Suitable alkyl groups for $R^1$ often have 1 to 10 carbon atoms, 1 to 6 carbon atoms, or 1 to 4 carbon atoms. Suitable arylalkyl groups for $R^1$, $R^{15}$, and substituents often have an alkyl portion with 1 to 12 carbon atoms, 1 to 8 carbon atoms, or 1 to 4 carbon atoms and an aryl portion having 6 to 12 carbon atoms such as phenyl or biphenyl. Exemplary oil displacing agents of Formula (XI) include, but are not limited to, alkyl oleates such as methyl oleate and alkyl benzoates such as isodecyl benzoate.

Suitable di-esters of use as oil displacing agents can be of Formula (XII).

In Formula (XII), each group $R^{17}$ independently is a linear or branched alkyl having at least 3 carbon atoms such as 3 to 20 carbon atoms, 3 to 18 carbon atoms, 3 to 12 carbon atoms, or 3 to 8 carbon atoms. Group $R^{18}$ is an alkane-diyl (i.e., an alkane-diyl is a divalent radical of an alkane and can be referred to as an alkylene), a heteroalkane-diyl (i.e., a heteroalkane-diyl is a divalent radical of a heteroalkane and can be referred to as a heteroalkene), or an alkene-diyl (i.e., an alkene-diyl is a divalent radical of an alkene). The alkane-diyl, heteroalkane-diyl, and alkene-diyl have at least 2 carbon atoms and often have 2 to 20 carbon atoms, 2 to 16 carbon atoms, 2 to 12 carbon atoms, or 2 to 8 carbon atoms. The heteroatom in the heteroalkane-diyl can be oxy, thio, or —NH—. The alkane-diyl, heteroalkane-diyl, and alkene-diyl can be unsubstituted or substituted with a hydroxyl group, an amino group, an aryl group, or alkylaryl group. Suitable amino group substituents are of formula —N(R$^1$)$_2$ where R$^1$ is an hydrogen, alkyl, aryl, or alkylaryl. Suitable aryl groups for R$^1$ and substituents often have 6 to 12 carbons such as a phenyl or biphenyl group. Suitable alkylaryl groups for R$^1$ and substituents often have an alkyl portion with 1 to 12 carbon atoms, 1 to 8 carbon atoms, or 1 to 4 carbon atoms and an aryl portion with 6 to 12 carbon atoms such as phenyl. Suitable alkyl groups for R$^1$ often have 1 to 12 carbon atoms, 1 to 8 carbon atoms, or 1 to 4 carbon atoms. Exemplary di-esters of Formula (XII) include, but are not limited to, dialkyl maleates such as diethylhexyl maleate, dialkyl adipates such as diisobutyl adipate, dialkyl succinates such as diisobutyl succinate, dialkyl glutarates such as diisobutyl glutarate, dialkyl fumarates such as dibutyl fumarate, and dialkly glutamates such as dibutyl glutamate.

Suitable tri-esters for use as oil displacing agents can be of Formula (XIII).

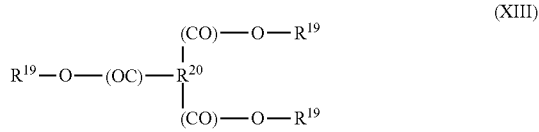

(XIII)

In Formula (XIII), each R$^{19}$ group independently is a linear or branched alkyl having at least 3 carbon atoms such as 3 to 20 carbon atoms, 3 to 18 carbon atoms, 3 to 12 carbon atoms, or 3 to 8 carbon atoms. Group R$^{20}$ is an alkane-triyl (i.e., an alkane-triyl is a trivalent radical of an alkane), heteroalkane-triyl (i.e., a heteroalkane-triyl is a trivalent radical of a heteroalkane), or alkene-triyl (i.e., a alkene-triyl is a trivalent radical of an alkene). The alkane-triyl, heteroalkane-triyl, and alkene-triyl have at least 2 carbon atoms and often have 2 to 20 carbon atoms, 2 to 16 carbon atoms, 2 to 12 carbon atoms, or 2 to 8 carbon atoms. The heteroatom in the heteroalkane-diyl can be oxy, thio, or —NH—. The alkane-triyl, heteroalkane-triyl, and alkene-triyl can be unsubstituted or substituted with a hydroxyl group, an amino group, an aryl group, or alkylaryl group. Suitable amino group substituents are of formula —N(R$^1$)$_2$ where R$^1$ is an hydrogen, alkyl, aryl, or alkylaryl. Suitable aryl groups for R$^1$ and substituents often have 6 to 12 carbons such as a phenyl or biphenyl group. Suitable alkylaryl groups for R$^1$ and substituents often have an alkyl portion with 1 to 12 carbon atoms, 1 to 8 carbon atoms, or 1 to 4 carbon atoms and an aryl portion with 6 to 12 carbon atoms such as phenyl or biphenyl. Suitable alkyl groups for R$^1$ often have 1 to 12 carbon atoms, 1 to 8 carbon atoms, or 1 to 4 carbon atoms. Exemplary compounds of Formula (XIII) include, but are not limited to, trialkyl citrates such as tributyl citrate.

The oil displacing agent can be selected from an epoxy alkane or epoxy perfluoralkane of Formula (XIV).

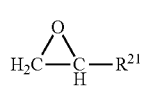

(XIV)

In Formula (XIV), group R$^{21}$ is an alkyl or perfluoroalkyl. The alkyl or perfluoroalkyl group can be linear, branched, cyclic, or a combination thereof. The alkyl or perfluoroalkyl group often has at least 3 carbon atoms such as 3 to 20 carbon atoms, 4 to 20 carbon atoms, 4 to 18 carbon atoms, 4 to 12 carbon atoms, or 4 to 8 carbon atoms. Exemplary compounds of Formula (XIV) include, but are not limited to, 1H,1H,2H-perfluoro(1,2-epoxy)hexane, 3,3-dimethyl-1,2-epoxybutane, 1,2-epoxyoctane, 1,2-epoxyhexane, 1,2-epoxybutane, 1,2-epoxydodecane, 1,2-epoxydecane, and 1,2-epoxycyclopentane.

Suitable cyclic terpenes for use as oil displacing agents include, but are not limited to, limonene, alpha-pinene, beta-pinene, 1,8-cineole, and the like. Suitable cyclic terpene oxides include, but are not limited to, limonene oxide and alpha-pinene oxide.

Trialkyl phosphates suitable for use as oil displacing agents often have alkyl groups with 2 to 10 carbon atoms. Some exemplary trialkyl phosphates include, but are not limited to, tripropyl phosphate, triethylphosphate, and tributyl phosphate.

Alkyl methacarylates that can be used as oil displacing agents often include an alkyl group with at least 4 carbon atoms, at least 6 carbon atoms, or at least 8 carbon atoms. For example, the alkyl group can have 6 to 20 carbon atoms, 6 to 18 carbon atoms, 6 to 12 carbon atoms, or 6 to 10 carbon atoms. The alkyl in the alkyl methacrylate can be cyclic, linear, branched, or a combination thereof. Examples include, but are not limited to, isodecyl methacrylate, and 3,3,5-trimethylcyclohexyl methacrylate.

Vinyl alkyl esters suitable for use as oil displacing agents often have an alkyl group that has at least 2 carbon atoms, at least 4 carbon atoms, or at least 6 carbon atoms. For example, the alkyl group can have 2 to 20 carbon atoms, 4 to 20 carbon atoms, 4 to 18 carbon atoms, 4 to 12 carbon atoms, or 4 to 8 carbon atoms. The alkyl in the vinyl alkyl ester can be cyclic, linear, branched, or a combination thereof. Examples include, but are not limited to, VEOVA 10, a vinyl ester of a highly branched carboxylic acid having 10 carbon atoms. VEOVA 10 is a trade designation of Hexion Specialty Chemicals in Columbus, Ohio.

Alkyl trialkoxysilane compounds that can be used as oil displacing agents often include an alkyl group having 1 to 10 carbon atoms, 2 to 10 carbon atoms, or 2 to 6 carbon atoms. The alkyl group can be unsubstituted or substituted with an amino group such as a primary amino group. The alkoxy groups often have 1 to 6 carbon atoms, 1 to 4 carbon atoms, or 1 to 3 carbon atoms. Examples include, but are not limited to, 3-aminopropyltriethoxysilane.

Alkanes that can be used as oil displacing agents often contain at least 6 carbon atoms. For example the alkanes can have at least 8 carbon atoms, at least 10 carbon atoms, or at least 12 carbon atoms. Examples include, but are not limited to, n-heptane, n-decane, n-undecane, and n-dodecane.

Alcohols that can be used as the oil displacing agents often contain at least 6 carbon atoms, at least 8 carbon atoms, or at least 12 carbon atoms. Examples include, but are not limited to, 1-octanol, 2-octanol, and 1-decanol.

Table 1 includes surface tension values and solubility parameter values for exemplary oil displacing agents.

TABLE 1

Characteristics of Various Oil Displacing Agents

| Oil Displacing Agent | Surface Tension (dynes/cm) | Solubility Parameter (cal$^{0.5}$/cm$^{1.5}$) |
|---|---|---|
| 1H,1H,2H-Perfluoro(1,2-Epoxy)hexane | 15.6 | 9.43 |
| 3-[2-(Perfluorohexyl)ethoxy]1,2-Epoxypropane | 18.3 | 9.17 |

TABLE 1-continued

Characteristics of Various Oil Displacing Agents

| Oil Displacing Agent | Surface Tension (dynes/cm) | Solubility Parameter ($cal^{0.5}/cm^{1.5}$) |
|---|---|---|
| 3,3-Dimethyl-1,2-Epoxybutane | 21.4 | 8.11 |
| 1,2-Epoxyoctane | 23.2 | 8.12 |
| 1,2-Epoxyhexane | 23.9 | 8.31 |
| 1,2-Epoxybutane | 24.3 | 8.31 |
| 1,2-Epoxydodecane | 25.1 | 8.08 |
| 1,2,7,8-Diepoxyoctane | 26.6 | 9.07 |
| 1,2-Epoxydecane | 27.8 | 8.10 |
| 1,2-Epoxycyclopentane | 30.4 | 9.13 |
| Cyclohexene Oxide | 31.6 | 8.93 |
| n-Decane | 22.7 | 7.41 |
| n-Heptane | 20.3 | 7.19 |
| 1-Octanol | 25.2 | 9.66 |
| 2-Octanol | 26.5 | 9.57 |
| 3-aminopropyltriethoxysilane | 23.5 | 9.37 |
| VEOVA 10 | 23.8 | 8.42 |
| α-Pinene | 26.3 | 8.06 |
| β-Pinene | 27.8 | 8.33 |
| Limonene | 26.9 | 8.02 |
| 1,8-Cineole | 29.3 | 8.65 |
| β-Pinene Oxide | 30.2 | 9.00 |
| Limonene Oxide | 31.4 | 8.80 |
| α-Pinene Oxide | 31.4 | 8.89 |
| Methyl Oleate | 29.0 | 8.19 |
| Isodecyl Benzoate | 29.6 | 9.19 |
| Dimethyl Adipate | 31.2 | 9.58 |
| Dibutyl Maleate | 27.6 | 9.08 |
| Dibutyl Fumarate | 28.7 | 9.08 |
| Diethylhexyl Maleate | 25.6 | 8.60 |
| Triethyl Citrate | 32.1 | 11.10 |
| Tributyl Citrate | 26.9 | 10.24 |
| Tributyl Phosphate | 26.9 | 9.17 |
| CARDURA N-10 | 28.9 | 8.84 |
| 3,3,5-Trimethylcyclohexyl Methacrylate | 26.7 | 8.10 |
| 1,3-Bis(Glycidoxypropyl)-tetramethyldisiloxane | 30.4 | 8.63 |
| 2,(3,4-Epoxycyclohexyl)-Ethyl Trimethoxysilane | 31.2 | 8.70 |

If an oil displacing agent is added, the curable compositions often contain at least 0.1 weight percent of the oil displacing agent based on a total weight of the curable composition. The amount is often at least 0.2 weight percent, at least 0.5 weight percent, or at least 1 weight percent. The curable composition can include up to 25 weight percent, up to 20 weight percent, up to 15 weight percent, or up to 10 weight percent of the oil displacing agent. In many embodiments, the oil displacing agent is present in an amount in the range of 0.1 to 25 weight percent, in the range of 0.5 to 20 weight percent, in the range of 1 to 20 weight percent, in the range of 1 to 10 weight percent, in the range of 2 to 10 weight percent, or in the range of 1 to 5 weight percent.

Other optional components such as fillers can be added to the curable compositions. The fillers can be added to the first part of the curable composition, to the second part of the curable composition, or to both the first part and the second part of the curable composition. Fillers are often added to promote adhesion, to improve corrosion resistance, to control the rheological properties, to reduce shrinkage during curing, to accelerate curing, to absorb contaminants, to improve heat resistance, or for a combination thereof. The fillers can be inorganic material, organic materials, or composite materials containing both inorganic and organic materials. The fillers can have any suitable size and shape. Some fillers are in the form of particles with spherical, elliptical, or platelet shapes. Other fillers are in the form of fibers.

Some fillers are inorganic fibers such as fiber glass (e.g., glass wool and glass filament), mineral wool (e.g., rock wool and slag wool), and refractory ceramic fibers. Some exemplary inorganic fibers include a mixture of $SiO_2$, $Al_2O_3$, or a combination thereof. The inorganic fibers can further include CaO, MgO, $Na_2O$, $K_2O$, $Fe_2O_3$, $TiO_2$, other oxides, or mixtures thereof. Exemplary inorganic fibers are commercially available under the trade designation COATFORCE (e.g., COATFORCE CF50 and COATFORCE CF10) from Lapinus Fibres BV in Roermond, The Netherlands. Other exemplary inorganic fibers can be prepared from wollastonite (i.e., calcium silicate).

Other fillers are organic fibers such as aramid fibers and polyolefin fibers such as polyethylene fibers. These organic fibers can be untreated or treated to change their hydrophobic or hydrophilic character. For example, some organic fibers are specially treated to make them hydrophobic or to increase their hydrohobicity. The fibers can be fibrillated. Exemplary polyolefin fibers include high-density polyethylene fibers such as those available under the trade designation SYLOTHIX (e.g., SYLOTHIX 52 and SYLOTHIX 53) from EP Minerals in Reno, Nev., those available under the trade designation ABROTHIX (e.g., ARBOTHIX PE100) from EP Minerals, those available under the trade designation SHORT STUFF (e.g., SHORT STUFF ESS2F and SHORT STUFF ESS5F) from MiniFIBERS, Inc. in Johnson City, Tenn., and those available under the trade designation INHANCE (e.g., INHANCE PEF) from Inhance/Fluoro-Seal, Limited in Houston, Tex. Exemplary aramid fibers are commercially available under the trade designation INHANCE (e.g., INHANCE KF) from Inhance/Fluoro-Seal, Ltd. in Houston, Tex.

Other suitable fillers include silica-gels, calcium silicates, calcium nitrate, calcium phosphates, calcium molybdates, calcium carbonate, calcium hydroxide, fumed silica, clays such as bentonite, organo-clays, aluminium trihydrates, glass microspheres, hollow glass microspheres, polymeric microspheres, and hollow polymeric microspheres. The fillers can also be a pigment such as ferric oxide, brick dust, carbon black, titanium oxide and the like. Any of these filler can be surface modified to make them more compatible with the curable or cured composition.

Exemplary fillers include a mixture of synthetic amorphous silica and calcium hydroxide that is commercially available from W.R. Grace in Columbia, Md. under the trade designation SHIELDEX (e.g., SHIELDEX AC5), a fumed silica treated with polydimethylsiloxane to prepare a hydrophobic surface that is available from Cabot GmbH in Hanau, Germany under the trade designation CAB-O-SIL (e.g., CAB-O-SIL TS 720), a hydrophobic fumed silica available from Degussa in Düsseldorf, Germany under the trade designation AEROSIL (e.g., AEROSIL VP-R-2935), glass beads class IV (250 to 300 micrometers) from CVP S.A. in France, and epoxysilane-functionalized (2 wt %) aluminium trihydrate available under the trade designation APYRAL 24ES2 from Nabaltec GmbH in Schwandorf, Germany.

In some embodiments, fillers with oil adsorbing characteristics (i.e., oil adsorbing fillers) are included in the curable compositions. These fillers can be naturally oil adsorbing or can be specially treated to make them oil adsorbing. Without wishing to be bound by theory, it is believed these fillers may absorb at least some of the hydrocarbon-containing material at the surface of a substrate thus enhancing the adhesive bond. Surprisingly, good adhesion can be obtained for the curable compositions in the absence of these oil adsorbing filler. That is, in some embodiments of the curable compositions, no oil adsorbing filler is added. Stated differently, the curable compositions can be free or substantially free (e.g., less than 0.1 weight percent, less than 0.05 weight percent, less than 0.02 weight percent, or less than 0.01 weight percent based on the weight of the curable composition) of oil adsorbing fillers.

The curable compositions, however, can typically tolerate the presence of at least some oil adsorbing fillers. If added, the oil adsorbing filler is typically present in an amount no greater than 10 weight percent based on the weight of the curable composition. If higher amounts of oil adsorbing fillers are added, the adhesive properties such as t-peel strength and cohesive strength often decrease. The amount of oil adsorbing fillers are often no greater than 8 weight percent, no greater than 5 weight percent, or no greater than 3 weight percent based on a total weight of the curable composition. In many embodiments, the curable composition includes 0.1 to 8 weight percent, 0.1 to 5 weight percent, 0.1 to 4 weight percent, 0.1 to 3 weight percent, or 0.1 to 2 weight percent oil adsorbing filler.

The curable composition can contain any suitable amount of filler that is not oil adsorbing. In many embodiments, the curable composition contains 0.01 to 50 weight percent non-oil adsorbing filler based on a total weight of the curable composition. For example, the amount can be in the range of 0.5 to 50 weight percent, in the range of 1 to 40 weight percent, in the range of 1 to 30 weight percent, in the range of 1 to 20 weight percent, in the range of 1 to 10 weight percent, in the range of 5 to 30 weight percent, or in the range of 5 to 20 weight percent.

The curable composition can include any number of other optional components. For example, an optional adhesion promoter can be added. Exemplary adhesion promoters include, but are not limited to, various silane compounds. Some silane compounds that are suitable for adhesion promoters have amino groups or glycidyl groups that can react with one or more components in the curable composition. One such silane compound is a glycidoxypropyltrimethoxysilane that is commercially available under the trade designation SILANE Z6040 from Dow Corning, Midland, Mich. Other exemplary adhesive promoters include various chelating agents such as those described in U.S. Pat. No. 6,632,872 (Pellerite et al.) and various chelate-modified epoxy resins such as those available from Adeka Corporation in Tokyo, Japan under the trade designation EP-49-10N and EP-49-20.

Solvents can be included in curable composition. The solvents are typically selected to be miscible with the curable composition. Solvents can be added to lower the viscosity of either the first part or the second part of the curable composition or can be added with one of the various components included in the curable composition. The amount of solvent is typically minimized and is often less than 15 weight percent based on a total weight of the curable composition. The solvent is often less than 12 weight percent, less than 10 weight percent, less than 8 weight percent, less than 6 weight percent, less than 4 weight percent, less than 2 weight percent, less than 1 weight percent, or less than 0.5 weight percent based on the total weight of the curable composition. Suitable organic solvents include those that are soluble in the curable composition and that can be removed during or after curing to form the cured composition. Example organic solvents include, but are not limited to, toluene, acetone, various alcohols, and xylene. The curable composition typically is in the form of a first part and a second part. The first part typically includes the epoxy resins, the reactive liquid modifier, plus other components that do not react with either the epoxy resin or the reactive liquid modifier. The second part typically includes the curing agent plus any other components that do not typically react with the curing agent. The toughening agent can be added to either the first part or the second part. The components in each part are typically selected to minimize reactivity within that part.

Alternatively, the curable composition can include additional parts such as a third part that can contain additional components or that can further separate the components of the curable composition. For example, the epoxy resin can be in a first part, the curing agent can be in a second part, and the reactive liquid modifier can be in a third part. The toughening agent, any optional oil displacing agent, and any optional fillers can each independently be in any of the first, second, or third parts.

The various parts of the curable composition are mixed together to form the cured composition. These parts are typically mixed together immediately prior to use of the curable composition. The amount of each part included in the mixture can be selected to provide the desired molar ratio of oxirane groups to amine hydrogen atoms and the desired molar ratio of reactive liquid modifier to amine hydrogen atoms.

The curable composition can be cured at room temperature, can be cured at room temperature and then at an elevated temperature (e.g., greater than 100° C., greater than 120° C., or greater than 150° C.), or can be cured at an elevated temperature. In some embodiments, the curable composition can be cured at room temperature for at least 3 hours, at least 6 hours, at least 12 hours, at least 18 hours, at least 24 hours, at least 48 hours, or at least 72 hours. In other embodiments, the curable composition can be cured at room temperature for any suitable length of time and then further cured at an elevated temperature such as, for example, 180° C. for a time up to 10 minutes, up to 20 minutes, up to 30 minutes, up to 60 minutes, up to 120 minutes, or even longer than 120 minutes.

The cured compositions may reach a desirable cohesive strength after short heat curing periods. Since the cohesive strength can often increase upon further curing under the same or different conditions, this kind of curing is referred to herein as partial curing. In principle, partial curing can be carried out using any kind of heating. In some embodiments, induction curing (e.g., spot induction curing or ring induction curing) may be used for partial curing. Induction curing is a non-contact method of heating using electric power to generate heat in conducting materials by placing an inductor coil through which an alternating current is passed in proximity to the cured composition. The alternating current in the work coil sets up an electromagnetic field that creates a circulating current in the work piece. This circulating current in the work piece flows against the resistivity of the material and generates heat. Induction curing equipment can be commercially obtained, for example, from EWS from IFF-GmbH in Ismaning, Germany. The induction curing can occur, for example, at temperatures in the range of 80° C. to 180° C. with exposure times up to 120 seconds, up to 90 seconds, up to 60 seconds, up to 45 seconds, or up to 30 seconds. In yet a further embodiment, curable compositions may undergo an induction cure, followed by further curing at room temperature, an elevated temperature, or both.

The cured compositions often form a robust bond with one or more substrates. A bond is typically considered to be robust if the bond breaks apart cohesively at high shear values when tested in an overlap shear test and if high T-peel strength values are obtained when tested in a T-peel test. The bonds may break in three different modes: (1) the adhesive splits apart, leaving portions of the adhesive adhered to both metal surfaces in a cohesive failure mode; (2) the adhesive pulls away from either metal surface in an adhesive failure mode; or (3) a combination of adhesive and cohesive failure (i.e., mixed mode failure).

The cured composition can typically adhere to clean metal surfaces and to metal surfaces contaminated with hydrocarbon-containing materials such as various oils and lubricants. The cured composition often has a cohesive strength, as measured by overlap shear strength using the method described herein, of at least 2500 psi (17.2 MPa). For example, overlap shear strength can be at least 3000 psi (20.7 MPa), at least 3200 psi (22.1 MPa), or at least 3500 psi (24.1 MPa).

The cured compositions may be used to supplement or completely eliminate a weld or mechanical fastener by applying the curable composition between two parts (i.e., between two surfaces of two substrates) to be joined and curing the adhesive to form a bonded joint. Alternatively, the cured compositions can be used to provide a polymeric coating on a substrate. Suitable substrates onto which the adhesive of the present invention may be applied include metals (e.g., steel, iron, copper, aluminum, or alloys thereof), carbon fiber, glass fiber, glass, epoxy fiber composites, wood, and mixtures thereof. In some embodiments, at least one of the substrates is a metal. In other embodiments, both substrates are metal.

The surface of the substrates may be cleaned prior to application of the curable composition. However, the curable compositions are also useful in applications when applied to substrates having hydrocarbon-containing material on the surface. In particular, the curable compositions may be applied to steel surfaces contaminated with various oils and lubricants such as, for example, mill oil, cutting fluid, and draw oil.

The curable composition can be applied as liquid, paste, spray, or solid that can be liquefied upon heating. The application can be as a continuous bead or as dots, stripes, diagonals or any other geometrical form that will result in the formation of a useful bond. In some embodiments, the curable composition is in a liquid or paste form.

When used as an adhesive, the cured composition can be augmented by welding or mechanical fastening. The welding can occur as spot welds, as continuous seam welds, or as any other welding technology that can cooperate with the adhesive composition to form a mechanically sound joint.

The cured compositions may be used as structural adhesives. In particular, they may be used as structural adhesives in vehicle assembly, such as the assembly of watercraft vehicles, aircraft vehicles, or motorcraft vehicles such as cars and motor bikes. In particular, the cured compositions may be used as hem-flange adhesives or in body frame construction. The cured compositions may also be used as structural adhesives in architectural applications or as structural adhesives in various household and industrial appliances.

In another aspect, a method of making a composite article is provided. The method includes applying a two-part curable composition to a substrate, and curing the two-part curable adhesive while in contact with the substrate to form a composite article. The resulting cured composition can function as a polymeric coating for the substrate.

In yet another aspect, a method of forming a bonded joint between substrates is provided. The method includes applying a two-part curable composition to a surface of at least one of two or more substrates, joining the substrates so that the two-part curable composition is positioned between the two or more substrates, and curing the curable composition to form a bonded joint between the two or more substrates. The cured composition may be used, for example, to bond metals to metals, metals to carbon fibers, carbon fibers to carbon fibers, metals to glass, or carbon fibers to glass.

Various items are provided that are a curable composition, a cured composition, and an article that includes the cured composition.

Item 1 is a curable composition that has a first part and a second part. The curable composition includes a) an epoxy resin, wherein the epoxy resin is in the first part of the curable adhesive composition; b) a curing agent having at least two groups of formula —NR$^1$H where R$^1$ is selected from hydrogen, alkyl, aryl, or alkylaryl, wherein the curing agent is in the second part of the curable composition; c) a toughening agent, wherein the toughening agent is in the first part, in the second part, or in both the first part and the second part of the curable composition; and d) a reactive liquid modifier that is in the first part of the curable composition. The reactive liquid modifier comprises an acetoacetate ester of a dimer alcohol, the acetoacetate ester having at least two acetoacetoxy groups.

Item 2 is the curable composition of item 1, wherein the dimer alcohol is of Formula (VI).

In Formula (VI), the group R$^8$ is an alkylene having 36 carbon atoms.

Item 3 is the curable composition of item 1, wherein the reactive liquid modifier if of Formula (VII).

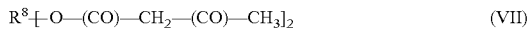

In Formula (VII), group R$^8$ is an alkylene having 36 carbon atoms.

Item 4 is the curable composition of any one of items 1 to 3, wherein the curable composition comprises 20 to 90 weight percent epoxy resin, 3 to 30 weight percent curing agent, 3 to 20 weight percent reactive liquid modifier, and 5 to 55 weight percent toughening agent based on a total weight of the curable composition.

Item 5 is the curable composition of any one of items 1 to 4, wherein the curable composition is free or substantially free of an oil displacing compound.

Item 6 is the curable composition of any one of items 1 to 4, wherein the curable composition is free or substantially free of oil adsorbing filler.

Item 7 is the curable composition of any one of items 1 to 4, wherein the curable composition is free or substantially free of an oil displacing compound and wherein the curable composition is free or substantially free of oil adsorbing filler.

Item 8 is the curable composition of any one of items 1 to 4, wherein the curable composition further comprises 0.1 to 25 weight percent oil displacing agent based on a total weight of the curable composition.

Item 9 is the curable composition of item 1 to 4, wherein the curable composition further comprises 0.1 to 8 weight percent of oil adsorbing filler.

Item 10 is the curable composition of item 1 to 4, wherein the curable composition further comprises 0.1 to 8 weight percent of oil adsorbing filler and 0.1 to 25 weight percent oil displacing agent based on a total weight of the curable composition.

Item 11 is the curable composition of any one of items 1 to 4, wherein the curable composition further comprises 0.5 to 50 weight percent of filler that is not oil adsorbing filler.

Item 12 is the curable composition of any one of items 1 to 9, wherein the acetoacetate ester comprises a reaction product of (i) an alkyl acetoacetate and (ii) a polyol comprising a dimer alcohol.

Item 13 is a cured composition Item 1 is a curable composition that has a first part and a second part. The curable composition includes a) an epoxy resin, wherein the epoxy resin is in the first part of the curable adhesive composition; b) a curing agent having at least two groups of formula —NR$^1$H where R$^1$ is selected from hydrogen, alkyl, aryl, or alkylaryl, wherein the curing agent is in the second part of the curable composition; c) a toughening agent, wherein the toughening agent is in the first part, in the second part, or in both the first part and the second part of the curable composition; and d) a reactive liquid modifier that is in the first part of the curable composition, the reactive liquid modifier comprising an acetoacetate ester of a dimer alcohol, the acetoacetate ester having at least two acetoacetoxy groups.

Item 14 is the cured composition of item 13, wherein the dimer alcohol is of Formula (VI).

In Formula (VI), group $R^8$ is an alkylene having 36 carbon atoms.

Item 15 is the cured composition of item 13, wherein the reactive liquid modifier if of Formula (VII).

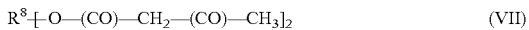

In Formula (VII), group $R^8$ is an alkylene having 36 carbon atoms.

Item 16 is the cured composition of any one of items 13 to 15, wherein the curable composition comprises 20 to 90 weight percent epoxy resin, 3 to 30 weight percent curing agent, 3 to 20 weight percent reactive liquid modifier, and 5 to 55 weight percent toughening agent based on a total weight of the curable composition.

Item 17 is the cured composition of any one of items 13 to 16, wherein the curable composition is free or substantially free of an oil displacing compound.

Item 18 is the cured composition of any one of items 13 to 16, wherein the curable composition is free or substantially free of oil adsorbing filler.

Item 19 is the cured composition of any one of items 13 to 16, wherein the curable composition is free or substantially free of an oil displacing compound and wherein the curable composition is free or substantially free of an oil adsorbing filler.

Item 20 is the cured composition of any one of items 13 to 16, wherein the curable composition further comprises 0.1 to 25 weight percent oil displacing agent based on a total weight of the curable composition.

Item 21 is the cured composition of any one of items 13 to 16, wherein the curable composition further comprises 0.1 to 8 weight percent of oil adsorbing filler.

Item 22 is the cured composition of any one of items 13 to 21, wherein the curable composition further comprises 0.5 to 50 weight percent of filler that is not oil adsorbing.

Item 23 is the cured composition of any one of items 13 to 22, wherein the cured composition is an adhesive.

Item 24 is the cured composition of any one of claims 13 to 22, wherein the cured composition is a polymeric coating.

Item 25 is an article that includes a first substrate and a cured composition positioned adjacent to the first substrate. The cured composition includes a reaction product of a curable composition containing: a) an epoxy resin; b) a curing agent having at least two groups of formula —$NR^1H$ where $R^1$ is selected from hydrogen, alkyl, aryl, or alkylaryl; c) a toughening agent; and d) a reactive liquid modifier that is in the first part of the curable composition. The reactive liquid modifier contains an acetoacetate ester of a dimer alcohol, the acetoacetate ester having at least two acetoacetoxy groups.

Item 26 is the article of item 25, wherein the cured composition is a polymeric coating.

Item 27 is the article of item 25 or 26 further comprising a second substrate and wherein the cured composition is position between the first substrate and the second substrate.

Item 28 is the article of item 27, wherein the cured composition is an adhesive composition.

Item 29 it the article of any one of items 25 to 28, wherein the curable composition is free or substantially free of oil displacing compound.

Item 30 is the article of any one of items 25 to 29, wherein the curable composition is free or substantially free of oil adsorbing filler.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Solvents and other reagents used were obtained from Aldrich Chemical Company, Milwaukee, Wis. unless otherwise noted.

TABLE 2

Glossary of Materials

| Material | Description |
|---|---|
| ANCAMINE K54 | Trade designation for 2,4,6-tris(dimethylaminomethyl phenol) that is commercially available from Air Products in Allentown, PA. This material was used as a secondary curative. |
| APYRAL 24ES2 | Trade designation of an epoxysilane-functionalized (2% w/w) aluminum trihydrate that is available from Nabaltec GmbH in Schwandorf, Germany. This filler material was added as a flame retardant and to increase heat resistance of the cured adhesive composition. |
| BENZOFLEX 131 | A technical grade isodecyl benzoate provided by Genovique Specialties, Rosemount, IL. |
| CAB-O-SIL TS720 | Trade designation for fumed silica that has been surface modified with polydimethylsiloxane. This filler material was obtained from Cabot Corporation in Boston, MA. |
| CARDURA N10 | Trade designation of a glycidyl ester of versatic acid that was obtained from Hexion Specialty Chemicals, Houston, TX. The material has an approximate epoxy equivalent weight of 240 to 256 grams/equivalent and was used as an oil displacing agent. |

TABLE 2-continued

Glossary of Materials

| Material | Description |
| --- | --- |
| Calcium nitrate, 4-hydrate | A cure accelerator that was obtained from J. T. Baker, Phillipsburg, NJ. |
| EPON 828 | Trade designation of a diglycidyl ether of bisphenol A having an approximate epoxy equivalent weight of 187.5 grams/equivalent. This epoxy resin was obtained from Hexion Specialty Chemicals in Houston, TX. |
| EPONEX 1510 | Trade designation of a diglycidyl ether of hydrogenated bisphenol A having an approximate epoxy equivalent weight of 210 grams/equivalent. This epoxy resin was obtained from Hexion Specialty Chemicals, Houston, TX. |
| Glass beads | Filler obtained from MO-SCI Specialty Products, LLC in Rolla, MO. The particle size was 250 micrometers ± 5%. |
| IPDA | Isophoronediamine obtained from TCI America, Portland, OR. This was used as a secondary curative. |
| JEFFAMINE D230 | Trade designation for a polyether diamine with an amine hydrogen equivalent weight of 60 grams/equivalent available from Huntsman Corporation (The Woodlands, Texas). This was used as a curing agent. |
| KANE ACE B564 | Trade designation for a methacrylate-butadiene-styrene core shell rubber toughening agent in powdered form available from Kaneka Texas Corporation, Pasadena, TX. |
| KANE ACE MX257 | Trade designation for a toughening agent obtained from Kaneka Texas Corporation, Pasadena, TX. |
| K-FLEX XM B301 | A tri-acetoacetate functional ester obtained from King Industries, Norwalk, CT. This material was used in the Comparative Examples and is not an acetoacetate ester of a dimer acid. |
| Polyamidoamine A | An amine-terminated polyamide prepared as described in Example 2 of U.S. Pat. No. 5,629,380 (Baldwin et al.). This material was added as a curing agent. |
| PRIPOL 2033 | Trade designation for a fatty acid-based dimer diol provided by Croda USA, Edison, NJ. |
| SHIELDEX AC5 | Trade designation for an ion-exchanged, synthetic, amorphous silica, available from W. R. Grace, Colombia, MD. This filler material was added for corrosion resistance. |
| SILANE Z6040 | Trade designation of a glycidoxypropyltrimethoxysilane, available from Dow Corning, Midland, MI. This material was added as an adhesion promoter. |
| SYLOTHIX 52 | Trade designation of a combination of 400 micrometer long polyethylene fibers and synthetic amorphous silicic acid, and was obtained from EP Minerals in Reno, NV. |
| TTD | Refers to 4,7,10-trioxa-1,13-tridecane diamine obtained from TCI America, Portland, OR. The material was added as a curing agent. |
| Wollastonite | Refers to calcium silicate, available from Sigma-Aldrich in Milwaukee, WI. This filler material was added to enhance oil absorption. |
| Zeller-Gmelin KTL N16 | A deep-draw oil obtained from Zeller-Gmelin GmbH & Co. KG, Eislingen, Germany. |

Test Methods

Oiling of Metal Panels

Oiled steel panels (galvanized steel specimens used as received) were prepared by applying a specified volume of Zeller-Gmelin KTL N16 oil to provide a coating of 3 grams per square meter for the area to be coated using density data obtained from the Material Safety Data Sheet supplied by the supplier of the oil. A clean fingertip of a nitrile glove was used to spread the oil uniformly over the surface. Once the surface was covered, the oiled steel panels were stored at room temperature for 24 hours prior to use.

Generation of Lap Shear Bonds

Lap shear specimens were made using galvanized steel test specimens measuring 4 inches by 1 inch by 0.063 inches (101.6 mm by 25.4 mm by 1.6 mm) that were oiled using the above protocol describing the oiling of steel panels. The lap shear specimen was generated as described in ASTM Specification D 1002-05. A strip of approximately 0.5 inch (12.7 mm) wide and 0.010 inch (0.25 mm) thick of curable composition was applied to one edge of each of the two oiled lap shear specimens using a scraper. The glass beads, which had a diameter of about 250 micrometers, served as spacers within the curable composition. Two oiled lap shear specimens were bonded together and clamped using a 1 inch binder clip to apply pressure to provide for spreading of the curable composition. At least five bonds were made for each condition being testing. After the curable composition had been allowed to cure (as described in the examples), the bonds were tested to failure at room temperature on a Sintech Tensile Testing machine (MTS, Eden Prairie, Minn.) using a crosshead displacement rate of 0.1 inch (2.5 mm) per minute. The failure load was recorded. The lap width was measured with a vernier caliper. The quoted lap shear strengths were calculated as failure load divided by measured bond area. The average and standard deviation were calculated from the results of at least five tests unless otherwise noted.

Generation of T-Peel Bonds

T-peel specimens were made using cold rolled steel test specimens (Type "S" Steel, with dimensions of 12 inches by 1 inches by 0.032 inches (304.8 mm by 25.4 mm by 0.81 mm) and with square corners, 1010 CRS from Q-Lab Corporation in Cleveland, Ohio). These steel test specimens were oiled as described above describing the oiling of steel panels. The T-peel specimen was generated as described in ASTM D-1876. A strip of approximately 1 inch by 9 inch by 10 mil (1 mil is 0.001 inches) (25.4 mm by 228.6 mm by 0.25 mm)

of curable composition was applied to each oiled T-peel specimen. The glass beads, which had a diameter of about 250 micrometers, served as spacers within the curable composition.

The two oiled T-peel specimens were bonded together and clamped using six 1 inch binder clips to apply pressure to provide for spreading of the curable composition and to fixture the bond for cure. After the curable composition had been allowed to cure (as described in the examples), the bonds were tested to failure at room temperature on a Sintech Tensile Testing machine using a crosshead displacement rate of 12 inches (304.8 mm) per minute. The initial part of the loading data was ignored. The average load was measured after about 1 inch was peeled. The quoted T-peel strength was the average of at least two peel measurements.

Generation of Symmetric 15011343:2003E Bonds

ISO11343:2003E symmetric wedge specimens (i.e., article formed by bonding two substrates with an cured composition) were generated using zinc electro-galvanized steel (EZG60G60E) that had a nominal thickness of 0.030 inches (0.75 mm) and was fabricated according to FIG. 2 in the ISO11343:2003E specification. The galvanized steel was obtained from ACT Test Panels, LLC in Hillsdale, Mich. The symmetric wedge specimen was generated as described in ISO11343:2003E. Two sets of symmetric wedge specimens were placed side-by-side, and a strip of approximately 20 millimeter by 30 millimeter×250 micrometer of adhesive was applied to each symmetric wedge. The glass beads, which had a diameter of about 250 micrometers, served as spacers within the curable composition. After the adhesive was applied to the symmetric wedge specimens, they were clamped together with two 1" binder clips.

The clamped symmetric wedge specimens were cured at room temperature for 24 hours and then at 180° C. for 30 minutes in a forced air oven. After the curable composition had been allowed to cure (as described in the examples), the bonds were tested according to the ISO11343:2003E symmetric wedge method on a Dynatup 9250HV impact tester (Instron, Norwood, Mass.) at an initial impact speed of approximately 2 meters per second and an initial impact energy of approximately 90 joules. Bonds tested at room temperature were at ambient laboratory conditions. The average peel force was calculated according to the ISO 11343:2003E specification. At least three bonds were tested for each example.

Preparation of Reactive Liquid Modifier 1 (RLM1)

A mixture of PRIPOL 2033 (100.00 grams), t-butyl acetoacetate (58.80 grams, obtained from TCI, Portland, Oreg.), and toluene (180 mL) was heated to reflux. The vapor that distilled from the reaction mixture was collected through a condenser. When the temperature of the vapor reached 115° C., the reaction mixture was cooled to room temperature. The mixture was then concentrated under vacuum to give the product as a colorless oil (126.30 grams).

Preparation of Curing Agent CA1

A one pint can was charged with Polyamidoamine A (65.4 grams) and TTD (86.3 grams). Calcium nitrate (4.9 grams) was added and the mixture was stirred at 600 revolutions per minute (RPM) at 80° C. for one hour. ANCAMINE K54 (28.5 grams) was added, and the mixture was stirred at 600 RPM at 80° C. for six hours. The mixture was cooled to room temperature, and then CAB-O-SIL TS720 (16 grams), SHIELDEX AC5 (16 grams), and APYRAL 24ES2 (16 grams) were added. The mixture was stirred for two minutes at 2000 PRM, then vacuum degassed and stored at room temperature until further use to prepare a curable composition.

Preparation of Curing Agent CA2

A one pint can was charged with Polyamidoamine A (65.4 grams), TTD (67 grams), and IPDA (17.5 grams). Calcium nitrate (4.9 grams) was added, and the mixture was stirred at 600 RPM at 80° C. for one hour. ANCAMINE K54 (28.5 grams) was added, and the mixture was stirred at 600 RPM at 80° C. for six hours. The mixture was cooled to room temperature, and then SYLOTHIX 52 (20 grams) and wollastonite (20 grams) were added. The mixture was stirred for two minutes at 2000 PRM, then vacuum degassed and stored at room temperature until further use.

Preparation of Curing Agent CA3

A one pint can was charged with Polyamidoamine A (10.02 grams), JEFFAMINE D230 (65.08 grams), and ANCAMINE K54 (19 grams). The mixture was stirred for five minutes at 600 RPM until homogeneous, then vacuum degassed and stored at room temperature until use.

Preparation of Curing Agent CA4

A one pint can was charged with JEFFAMINE D230 (65.08 grams) and ANCAMINE K54 (19 grams). The mixture was stirred for five minutes at 600 RPM until homogeneous, then vacuum degassed and stored at room temperature until use.

Preparation of Epoxy Resin Composition ER1 through ER10

A one pint can was charged as indicated in Table 3 with the EPON 828, EPONEX 1510, KANE ACE MX 257, CARDURA N-10 (if noted), SILANE Z6040, and either RLM1 or KANE ACE MX 257. The amounts shown in Table 3 are grams. Each mixture was stirred for five minutes at 2000 RPM until homogeneous. The remaining ingredients as indicated in Table 3 were then added and the resulting mixture was stirred for two minutes at 2000 RPM, vacuum degassed and stored at room temperature until further use to prepare a curable composition.

TABLE 3

Epoxy Resin Compositions

| | ER1 | ER2 | ER3 | ER4 | ER5 | ER6 | ER7 | ER8 | ER9 | ER10 |
|---|---|---|---|---|---|---|---|---|---|---|
| EPON 828 | 39.4 | 39.4 | 39.4 | 39.4 | 39.4 | 39.4 | 39.4 | 39.4 | 39.4 | 39.4 |
| EPONEX 1510 | 20 | 20 | 20 | 20 | 20 | 20 | 20 | 20 | 20 | 20 |
| KANE ACE MX 257 | 60.6 | 60.6 | 60.6 | 60.6 | 60.6 | 60.6 | 60.6 | 60.6 | 60.6 | 60.6 |
| SILANE Z6040 | 1 | 1 | 1 | 1 | 1 | 1 | 1 | 1 | 1 | 1 |
| RLM1 | | 12.1 | | 12.1 | | 12.1 | | 12.1 | | 12.1 |
| K-FLEX XM B301 | 12.1 | | 12.1 | | 12.1 | | 12.1 | | 12.1 | |
| SHIELDEX AC 5 | 6 | 6 | 6 | 6 | 6 | 6 | 6 | 6 | 6 | 6 |
| APYRAL 24ES2 | 6 | 6 | 6 | 6 | 6 | 6 | 6 | 6 | 6 | 6 |
| Wollastonite | 12 | 12 | | | 12 | 12 | 4 | 4 | | |
| CARDURA N-10 | | | 12 | 12 | 12 | 12 | 12 | 12 | | |

Preparation of Epoxy Resin Composition ER11

A one pint can was charged with EPON 828 (45.4 grams) and BENZOFLEX 131 (11 grams). KANE ACE B564 (20.7 grams) was added. The mixture was stirred for five minutes at 2000 RPM, and then placed in a 90° C. for two hours. The mixture was allowed to cool to room temperature, and then stirred for two minutes at 2000 RPM. SILANE Z6040 (1 grams) and RLM1 (7 grams) were added. The mixture was stirred for two minutes at 2000 RPM, then vacuum degassed and stored at room temperature until further use.

Preparation of Epoxy Resin Compositions ER12

A one pint can was charged with EPON 828 (64.5 grams), EPONEX 1510 (10 grams), KANE ACE MX 257 (40.5 grams), CARDURA N-10 (7.5 grams), SILANE Z6040 (3.8 grams), and RLM1 (13.1 grams). The mixture was stirred for five minutes at 2000 RPM until homogeneous. SYLOTHIX 52 (10 grams) and wollastonite (20 grams) were added. The mixture was stirred for two minutes at 2000 RPM, then vacuum degassed and stored at room temperature until further use.

Examples 1 to 9 and Comparative Examples 1 to 5

For each example, epoxy resin composition (ER1 to ER12) and the appropriate curing agents (CA1 to CA4) in the amounts as specified in Table 4 were thoroughly mixed together with 1% by weight of glass beads (250 micrometers in diameter) in a paper cup.

TABLE 4

Examples 1 to 9 and Comparative Examples 1 to 5

| Example | Curing Agent Mixture (grams) | Epoxy Resin Mixture (grams) | Oil Displacing Compound | Oil Absorbing Filler | Oiled Steel |
|---|---|---|---|---|---|
| Comparison 1 | A1 (8) | ER1 (34.96) | NO | YES | YES |
| Example 1 | A1 (8) | ER2 (34.96) | NO | YES | YES |
| Comparison 2 | A1 (8) | ER3 (32.72) | YES | NO | YES |
| Example 2 | A1 (8) | ER4 (32.72) | YES | NO | YES |
| Comparison 3 | A1 (8) | ER5 (34.24) | YES | YES | YES |
| Example 3 | A1 (8) | ER6 (34.24) | YES | YES | YES |
| Comparison 4 | A1 (8) | ER7 (33.28) | YES | YES | YES |
| Example 4 | A1 (8) | ER8 (33.28) | YES | YES | YES |
| Comparison 5 | A1 (8) | ER9 (33.36) | NO | NO | YES |
| Example 5 | A1 (10) | ER10 (41.7) | NO | NO | NO |
| Example 6 | A1 (10) | ER10 (41.7) | NO | NO | YES |
| Example 7 | A3 (5.51) | ER11 (25) | YES | NO | NO |
| Example 8 | A4 (5.06) | ER11 (25) | YES | NO | NO |
| Example 9 | A2 (10) | ER12 (21.5) | YES | YES | YES |

Bonds were prepared on clean or oiled steel specimens as specified. Examples 1 to 8 and Comparative Examples 1 to 5 were cured for 24 hours at room temperature followed by a 30 minute cure at 180° C. Example 9 was cured for 24 hours at room temperature. Overlap shear, T-peel and ISO11343 average impact peel tests were conducted at ambient temperature. Table 5 provided the test results and failure modes exhibited by each of the examples. In this table, AF refers to adhesive failure, CF refers to cohesive failure, and TCF refers to thin cohesive failure.

TABLE 5

Adhesive Properties

| Example | Failure mode | Overlap Shear (psi) | T-peel (lb/in) | Average Impact Peel (N/mm) |
|---|---|---|---|---|
| Comparative 1 | TCF | 4220 ± 193 | 54.8 ± 6.9 | 34 ± 4.2 |
| Example 1 | TCF | 3770 ± 152 | 26.8 ± 5.1 | 27.9 ± 1.1 |
| Comparative 2 | TCF | 2643 ± 1582 | 37.5 ± 7.8 | 22.2 ± 3.7 |
| Example 2 | CF | 3058 ± 555 | 68.8 ± 5 | 14.2 ± 0.3 |
| Comparative 3 | AF | 3862 ± 308 | 47 ± 8.5 | 28.1 ± 3.5 |
| Example 3 | AF | 3360 ± 766 | 18.8 ± 14.2 | 27.5 ± 4.6 |
| Comparative 4 | TCF | 4724 ± 331 | 46.5 ± 13.3 | 17.6 ± 3.0 |
| Example 4 | TCF | 3332 ± 765 | 45.3 ± 12.5 | 24.2 ± 1.7 |
| Comparative 5 | AF | 3884 ± 423 | 38.1 ± 12.4 | 29.7 ± 0.7 |
| Example 5 | TCF | 4709 ± 205 | 98 ± 0.5 | — |
| Example 6 | TCF | 4172 ± 209 | 54.8 ± 1.5 | 32.9 ± 1 |
| Example 7 | CF | 2669 ± 63 | 50.6 ± 0.8 | 15.4 ± 1.3 |
| Example 8 | CF | 2877 ± 150 | 36.6 ± 1.2 | 10.1 ± 0.8 |
| Example 9 | CF | 3026 ± 164 | 22.5 ± 3.2 | — |

We claim:

1. A curable composition having a first part and a second part, the curable composition comprising:
   a) an epoxy resin, wherein the epoxy resin is in the first part of the curable composition;
   b) a curing agent having at least two groups of formula —NR$^1$H where R$^1$ is selected from hydrogen, alkyl, aryl, or alkylaryl, wherein the curing agent is in the second part of the curable composition;
   c) a toughening agent, wherein the toughening agent is in the first part, in the second part, or in both the first part and the second part of the curable composition and wherein the toughening agent is a core-shell polymer, a butadiene-nitrile rubber, acrylic polymer or copolymer, an adduct of an amino-terminated material and an epoxy resin, or an adduct of a carboxy-terminated material and an epoxy resin; and
   d) a reactive liquid modifier that is in the first part of the curable composition, the reactive liquid modifier comprising an acetoacetate ester of a dimer alcohol, the acetoacetate ester having at least two acetoacetoxy groups.

2. The curable composition of claim 1, wherein the dimer alcohol is of Formula (VI)

$$R^8(OH)_2 \qquad (VI)$$

wherein R$^8$ is an alkylene having 36 carbon atoms.

3. The curable composition of claim 1, wherein the reactive liquid modifier if of Formula (VII)

$$R^8\text{\textemdash}[O\text{\textemdash}(CO)\text{\textemdash}CH_2\text{\textemdash}(CO)\text{\textemdash}CH_3]_2 \qquad (VII)$$

wherein R$^8$ is an alkylene having 36 carbon atoms.

4. The curable composition of claim 1, wherein the curable composition comprises 20 to 90 weight percent epoxy resin, 3 to 30 weight percent curing agent, 3 to 20 weight percent reactive liquid modifier, and 5 to 55 weight percent toughening agent based on a total weight of the curable composition.

5. The curable composition of claim 1, wherein the curable composition is free or substantially free of an oil displacing compound.

6. The curable composition of claim 1, wherein the curable composition is free or substantially free of an oil adsorbing filler.

7. The curable composition of claim 1, wherein the curable composition further comprises 0.1 to 25 weight percent oil displacing agent based on a total weight of the curable composition.

8. The curable composition of claim 1, wherein the curable composition further comprises 0.1 to 8 weight percent of an oil adsorbing filler.

9. A cured composition comprising a reaction product of a curable composition comprising:
   a) an epoxy resin;
   b) a curing agent having at least two groups of formula —NR$^1$H where R$^1$ is selected from hydrogen, alkyl, aryl, or alkylaryl;
   c) a toughening agent that is a core-shell polymer, a butadiene-nitrile rubber, acrylic polymer or copolymer, an adduct of an amino-terminated material and an epoxy resin, or an adduct of a carboxy-terminated material and an epoxy resin; and
   d) a reactive liquid modifier comprising an acetoacetate ester of a dimer alcohol, the acetoacetate ester having at least two acetoacetoxy groups.

10. The cured composition of claim 9, wherein the dimer alcohol is of Formula (VI)

R$^8$(OH)$_2$      (VI)

wherein R$^8$ is an alkylene having 36 carbon atoms.

11. The cured composition of claim 9, wherein the reactive liquid modifier if of Formula (VII)

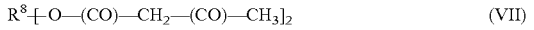

R$^8$[—O—(CO)—CH$_2$—(CO)—CH$_3$]$_2$      (VII)

wherein R$^8$ is an alkylene having 36 carbon atoms.

12. The cured composition of claim 9, wherein the curable composition comprises 20 to 90 weight percent epoxy resin, 3 to 30 weight percent curing agent, 3 to 20 weight percent reactive liquid modifier, and 5 to 55 weight percent toughening agent based on a total weight of the curable composition.

13. The cured composition of claim 9, wherein the curable composition is free or substantially free of an oil displacing compound.

14. The cured composition of claim 9, wherein the curable composition is free or substantially free of an oil adsorbing filler.

15. An article comprising a first substrate and a cured composition positioned adjacent to the first substrate, the cured composition comprising a reaction product of a curable composition comprising:
   a) an epoxy resin;
   b) a curing agent having at least two groups of formula —NR$^1$H where R$^1$ is selected from hydrogen, alkyl, aryl, or alkylaryl;
   c) a toughening agent that is a core-shell polymer, a butadiene-nitrile rubber, acrylic polymer or copolymer, an adduct of an amino-terminated material and an epoxy resin, or an adduct of a carboxy-terminated material and an epoxy resin; and
   d) a reactive liquid modifier comprising an acetoacetate ester of a dimer alcohol, the acetoacetate ester having at least two acetoacetoxy groups.

16. The article of claim 15, wherein the dimer alcohol is of Formula (VI)

R$^8$(OH)$_2$      (VI)

wherein R$^8$ is an alkylene having 36 carbon atoms.

* * * * *

UNITED STATES PATENT AND TRADEMARK OFFICE
CERTIFICATE OF CORRECTION

PATENT NO.          : 9,051,497 B2
APPLICATION NO.     : 13/883400
DATED               : June 9, 2015
INVENTOR(S)         : Christopher Campbell et al.

It is certified that error appears in the above-identified patent and that said Letters Patent is hereby corrected as shown below:

In the Specification

Column 4
Lines 65-66, delete "dihydroxydiphenylpropylenphenylmethane," and insert -- dihydroxydiphenylpropylenephenylmethane, --, therefor.

Column 5
Line 41, delete "cylcohexyl," and insert -- cyclohexyl, --, therefor.

Column 6
Line 10, delete "Allentonwn," and insert -- Allentown, --, therefor.

Column 7
Lines 39-40, delete "isophorene" and insert -- isophorone --, therefor.

Line 44, delete "trioxamidecane-" and insert -- trioxatridecane- --, therefor.

Column 8
Line 33, delete "oxarine" and insert -- oxirane --, therefor.

Line 34, delete "imidizoles" and insert -- imidazoles --, therefor.

Column 9
Lines 22-23, delete "aceotacetate," and insert -- acetoacetate, --, therefor.

Column 17
Line 15, delete "dialkly" and insert -- dialkyl --, therefor.

Line 55, delete "perfluoralkane" and insert -- perfluoroalkane --, therefor.

Signed and Sealed this
Twelfth Day of April, 2016

Michelle K. Lee
*Director of the United States Patent and Trademark Office*

Column 18
Line 18, delete "methacarylates" and insert -- methacrylates --, therefor.

Column 20
Line 16, delete "hydrohobicity." and insert -- hydrophobicity. --, therefor.

Column 29
Line 16, delete "15011343:2003E" and insert -- ISO11343:2003E --, therefor.

In the Claims

Column 32
Line 51, in Claim 3, delete

" $R^8{+\!\!-\!\!O\!-\!(CO)\!-\!CH_2\!-\!(CO)\!-\!CH_3]hd\, 2}$ " and insert

-- $R^8{\left[\!-\!O\text{-}(CO)\text{-}CH_2\text{-}(CO)\text{-}CH_3\right]_2}$ --, therefor.